TRANSFER APPLYING METHOD AND APPARATUS

Filed Dec. 13, 1967 17 Sheets-Sheet 1

Inventor:-
Allan C. Davis,
By Hibben, Noyes & Bicknell Attys.

May 26, 1970 A. C. DAVIS 3,513,616

TRANSFER APPLYING METHOD AND APPARATUS

Filed Dec. 13, 1967 17 Sheets-Sheet 2

TRANSFER APPLYING METHOD AND APPARATUS

Filed Dec. 13, 1967 17 Sheets-Sheet 4

TRANSFER APPLYING METHOD AND APPARATUS

Filed Dec. 13, 1967

17 Sheets-Sheet 5

May 26, 1970 A. C. DAVIS 3,513,616

TRANSFER APPLYING METHOD AND APPARATUS

Filed Dec. 13, 1967 17 Sheets-Sheet 9

TRANSFER APPLYING METHOD AND APPARATUS

TRANSFER APPLYING METHOD AND APPARATUS

Filed Dec. 13, 1967 17 Sheets-Sheet 14

TRANSFER APPLYING METHOD AND APPARATUS

Filed Dec. 13, 1967 17 Sheets-Sheet 16

United States Patent Office 3,513,616
Patented May 26, 1970

3,513,616
TRANSFER APPLYING METHOD AND APPARATUS

Allan C. Davis, Baltimore, Md., assignor to The Meyercord Co., Wheaton, Ill., a corporation of Illinois Filed Dec. 13, 1967, Ser. No. 690,346
Int. Cl. B65b *61/20, 43/39, 7/20*
U.S. Cl. 53—3 56 Claims

ABSTRACT OF THE DISCLOSURE

This disclosure relates to a method and apparatus for contemporaneously applying transfers to a plurality of articles, such as packages of cigarettes, within a plurality of receptacles or cartons. More particularly, this disclosure relates to a method and apparatus for supplying a group of cartons, separating the cartons, opening the cartons to expose packages of cigarettes within the cartons, applying tax or revenue transfers to the packages of cigarettes, and closing the cartons.

Many states and municipalities require that revenue or tax stamps or transfers be applied to packages of cigarettes before the cigarettes are sold at retail outlets to the general public. The tax stamps or transfers are usually sold on long sheets or webs by the state or municipality to wholesale distributors of the cigarettes. The wholesale distributors must open receptacles or cartons in which ten packages of cigarettes are commonly enclosed by a manufacturer. The tax stamps or transfers are then applied from the supply sheet or web to the packages of cigarettes. After the tax stamps have been applied, the carton is closed with a suitable adhesive and distributed to retail outlets for sale to the public.

A number of machines have been devised for expediting the above described process of applying tax stamps or transfers to packages of cigarettes. Although the known transfer applying machines represent a substantial improvement over manual methods of applying tax transfers to cigarette packages, these known machines have a limited rate of production due to their inability to apply transfers to packages of cigarettes in more than one carton at a time. The rate of production of these known machines is still further limited by a necessity of indexing a stamp platen relative to the transfer supply sheet each time a carton of cigarettes is processed so that all of the tax stamps on the supply sheet are used.

In addition to the aforementioned limitations on production rate, difficulty is encountered in feeding or supplying cartons of cigarette packages to known transfer applying machines. The difficulty in supplying cartons of cigarettes to known machines results from the fact that the cartons must be supplied with adhered closure flaps on the cartons in a predetermined orientation or position relative to the machines. The necessity for such a predetermined orientation of the cartons with known machines is due to the fact that the closure flaps on cartons of cigarettes are of different widths or sizes. A relatively narrow or small inner flap is connected by a suitable adhesive to a relatively wide or large outer flap on which advertising material or other indicia are commonly printed. The cartons of cigarettes must be fed or supplied to known transfer applying machines with the flaps in a predetermined orientation so that the cartons will be closed by the machines with the flaps in their initial relationship, that is with the relatively wide flap overlying the relatively narrow flap.

Another difficulty often encountered with known transfer applying machines is their inability to apply transfers to packages of cigarettes of various sizes. Thus, different machines or substitute parts must be used for processing cartons of "regular" size, "king-size" and "imperial-length" cigarettes. Of course, having a machine to process cartons of cigarettes of each size requires a substantial investment, and the installation of substitute parts in a particular machine is a time-consuming procedure.

Still further difficulties are encountered with known transfer applying machines in packing the cartons of stamped cigarette packages into shipping containers. The cartons of stamped cigarette packages are expelled or turned out one at a time from prior art transfer applying machines. The cartons are then individually handled and inserted into shipping containers. After sixty cartons have been placed one at a time into a standard shipping container, the container is sealed for shipment.

In view of the foregoing remarks it can be seen that known transfer applying machines have many serious shortcomings which contribute substantially to the time and expense required for applying tax or revenue stamps or transfers to packages of cigarettes. Therefore, it is an object of this invention to provide a transfer applying apparatus which overcomes the aforementioned shortcomings of known apparatus. Specifically it is an object of this invention to provide an improved method and apparatus for contemporaneously applying transfers to a plurality of articles, such as packages of cigarettes, in a plurality of cartons or receptacles.

Another object of this invention is to provide apparatus for opening and closing receptacles having a plurality of flaps of different sizes when the receptacles are in any one of a plurality of orientations.

Another object of this invention is to provide an improved method and apparatus for contemporaneously applying transfers from a single transfer supply sheet to a central portion of a plurality of packages of cigarettes within a plurality of receptacles or cartons.

Another object of this invention is to provide a method and apparatus for applying transfers to a plurality of articles within a group of receptacles and interspersing one group of the receptacles with another group of the receptacles after application of the transfers to facilitate packing the two groups of receptacles in shipping containers.

Another object of this invention is to provide an apparatus for selecting a predetermined flap of a plurality of flaps on a receptacle and applying adhesive to only the predetermined flap when the receptacle is in any one of a plurality of positions.

Another object of this invention is to provide a novel and improved transfer applicator apparatus for contemporaneously applying transfers from a plurality of rows of transfers on a transfer supply sheet to a plurality of articles in a plurality of receptacles.

Another object of this invention is to provide a method and apparatus for automatically positioning a plurality of receptacle relative to each other, opening the plurality of receptacles to expose a plurality of articles within the receptacles, contemporaneously applying transfers to the plurality of articles within the plurality of receptacles, and closing the receptacles.

Another object of this invention is to provide an improved apparatus for applying transfers to cartons of cigarettes of different sizes, such as cartons of "regular," "king-size" and "imperial-length" cigarettes.

These and other objects and features of the invention will become more apparent upon consideration of the following detailed description taken in connection with the accompanying drawings wherein:

FIG. 1 is a perspective view of an assembly or apparatus for opening receptacles or cartons, applying transfers to articles or packages of cigarettes in the cartons and closing the cartons;

FIGS. 2*a* and 2*b* form a plan view illustrating the apparatus of FIG. 1;

Figure 2A:
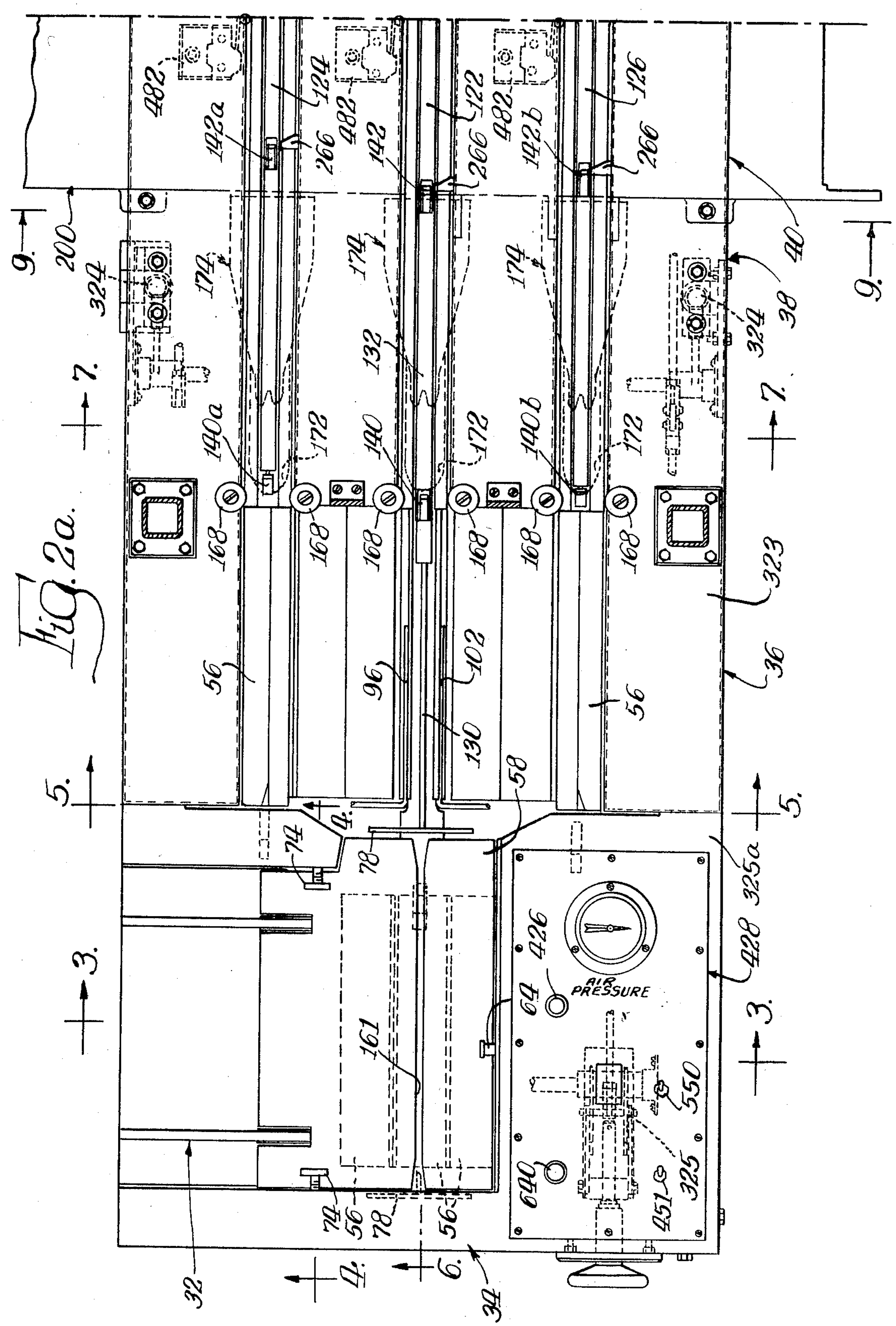
Figure 2B:
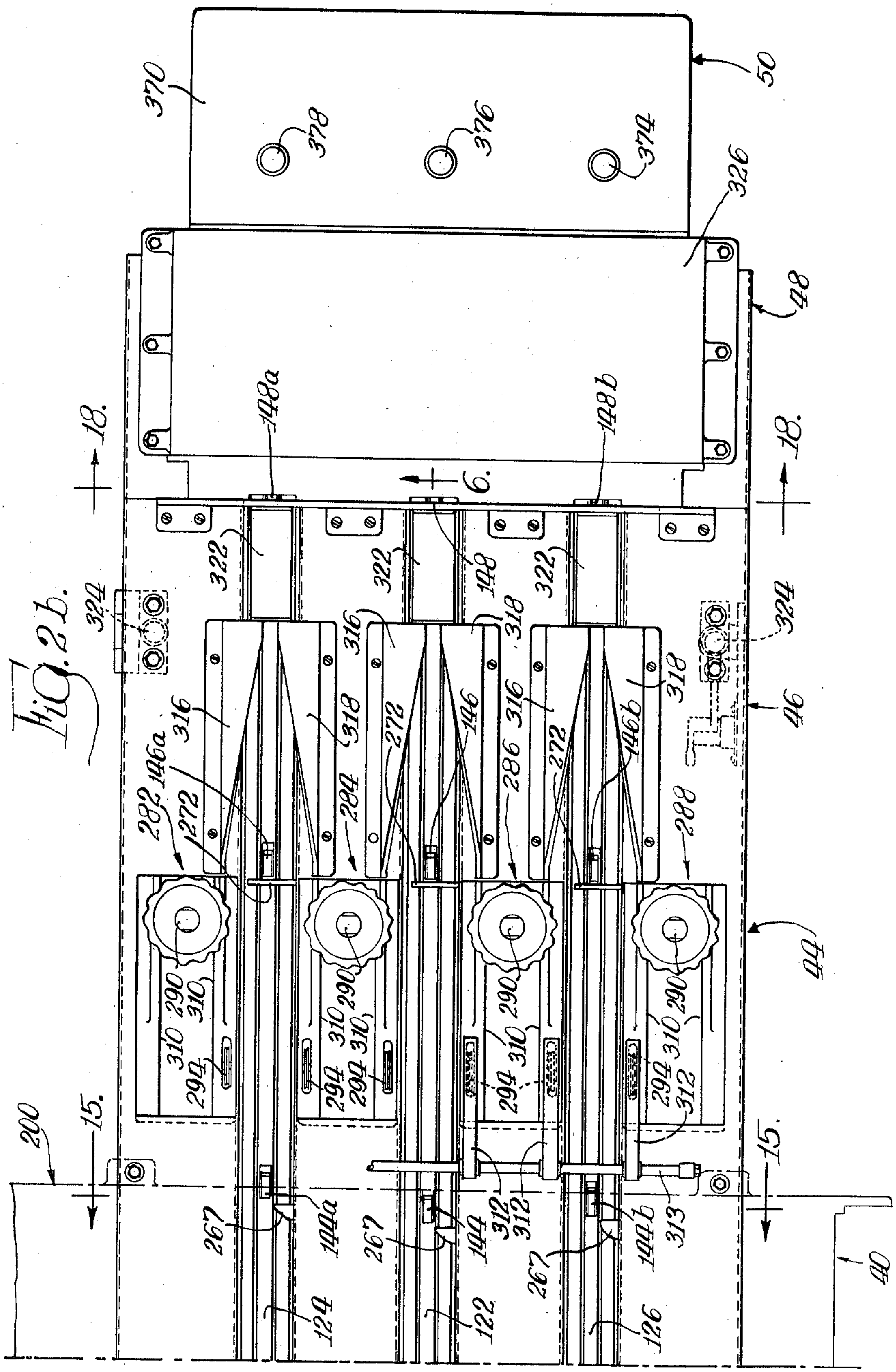
Figures 8, 8A:
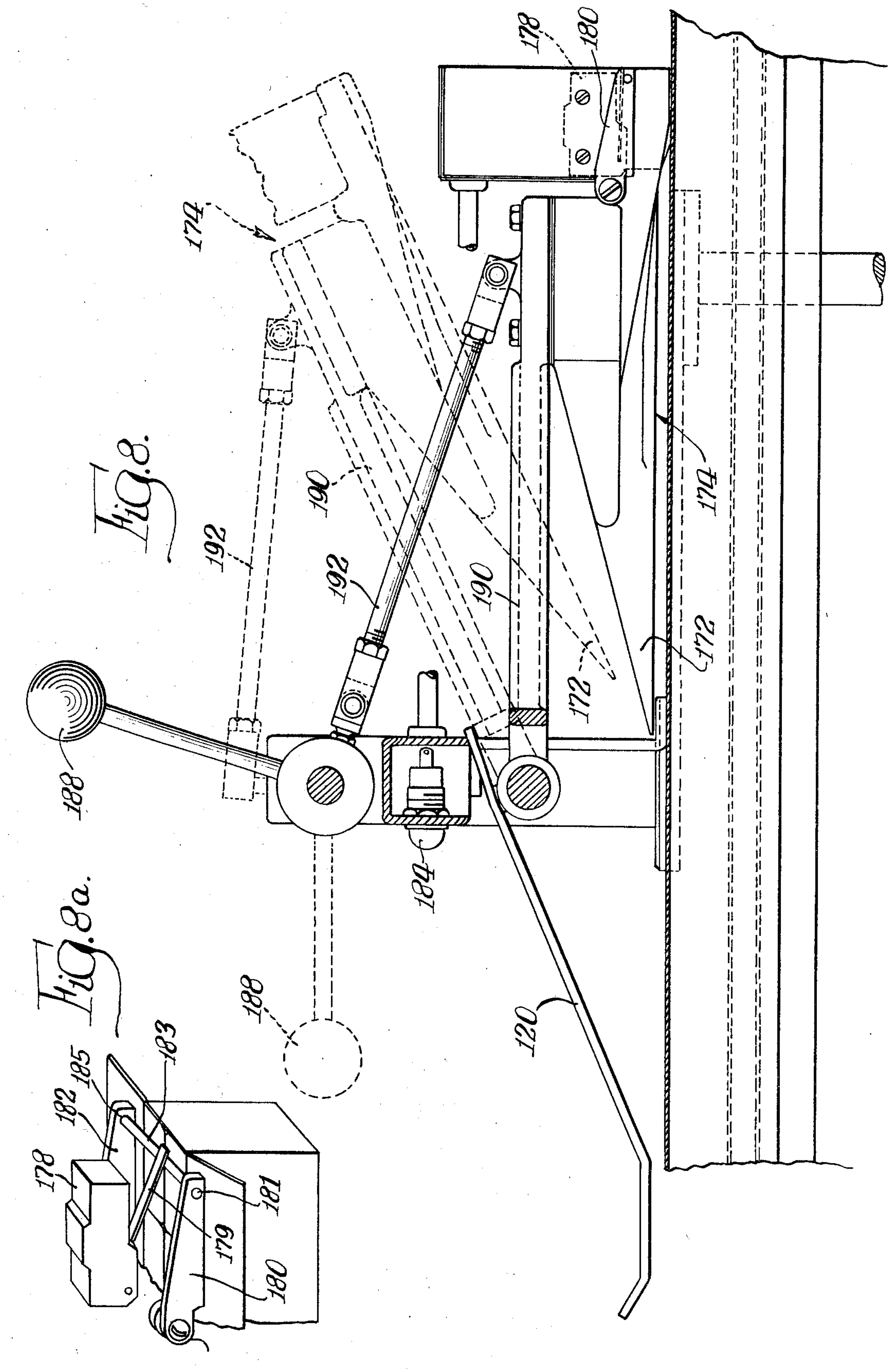
FIG. 8 is an elevational sectional view, taken along the line 8—8 of FIG. 7, further illustrating the structure of the carton opening station.
Figure 9:
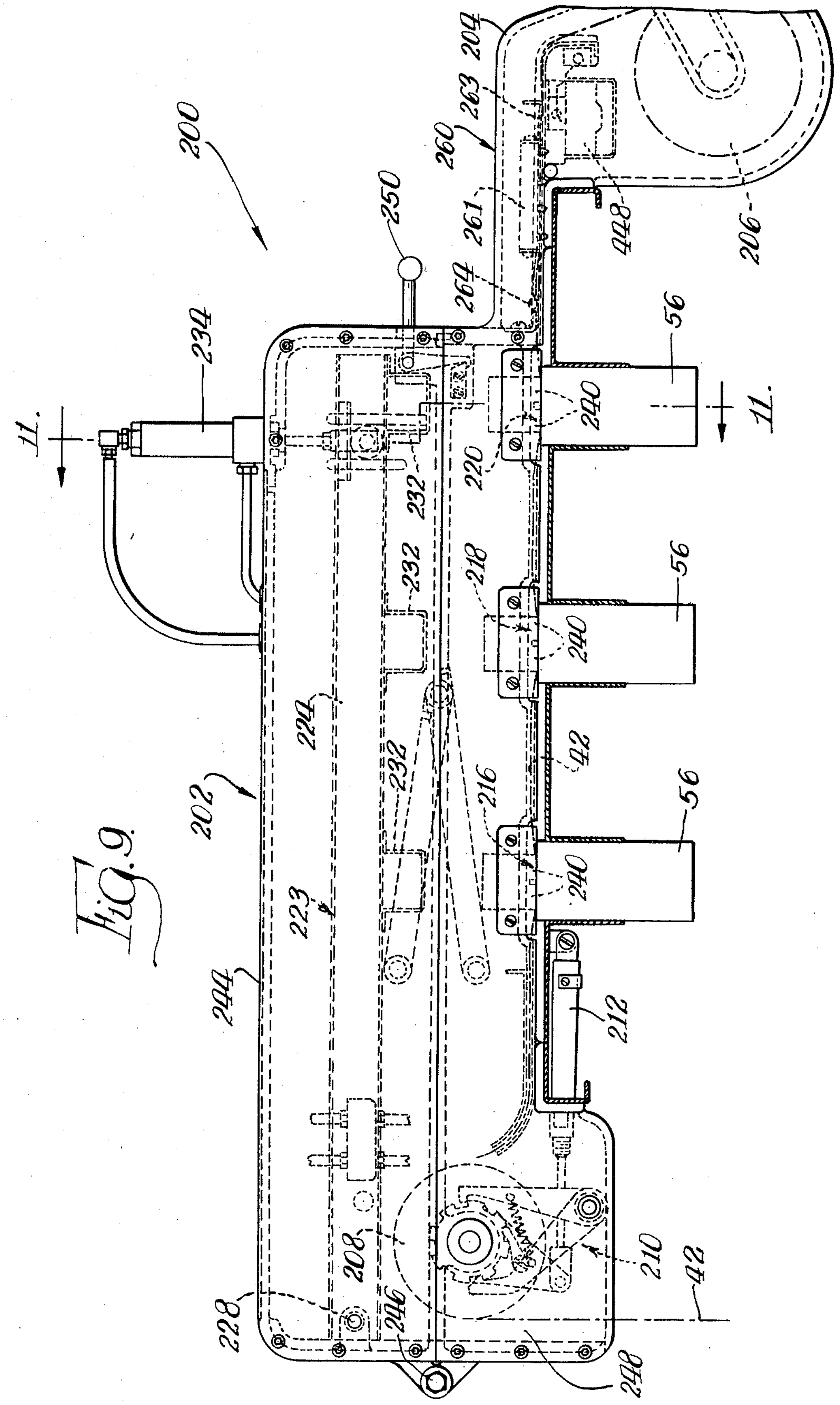
Figure 10:
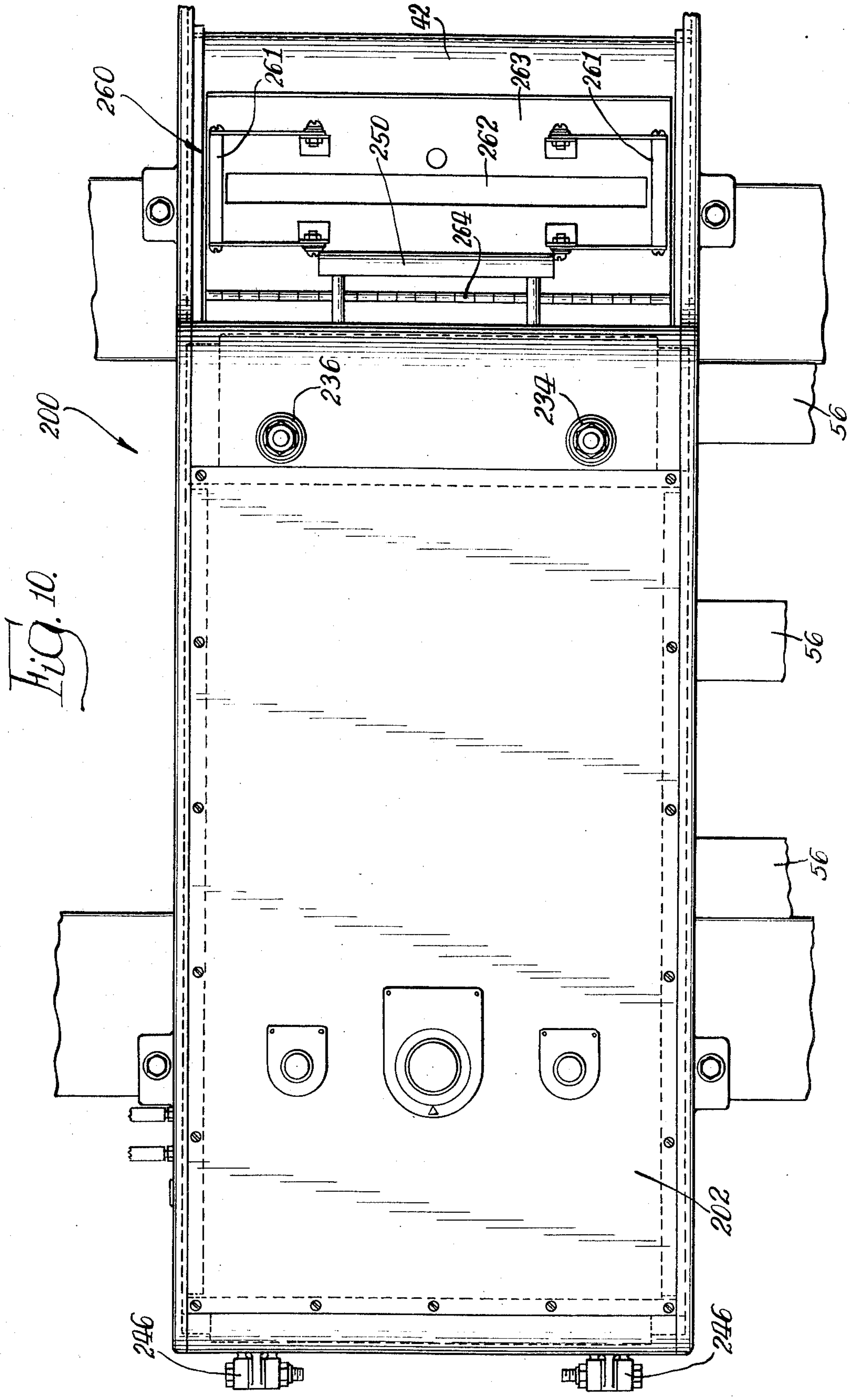
Figures 11, 15:
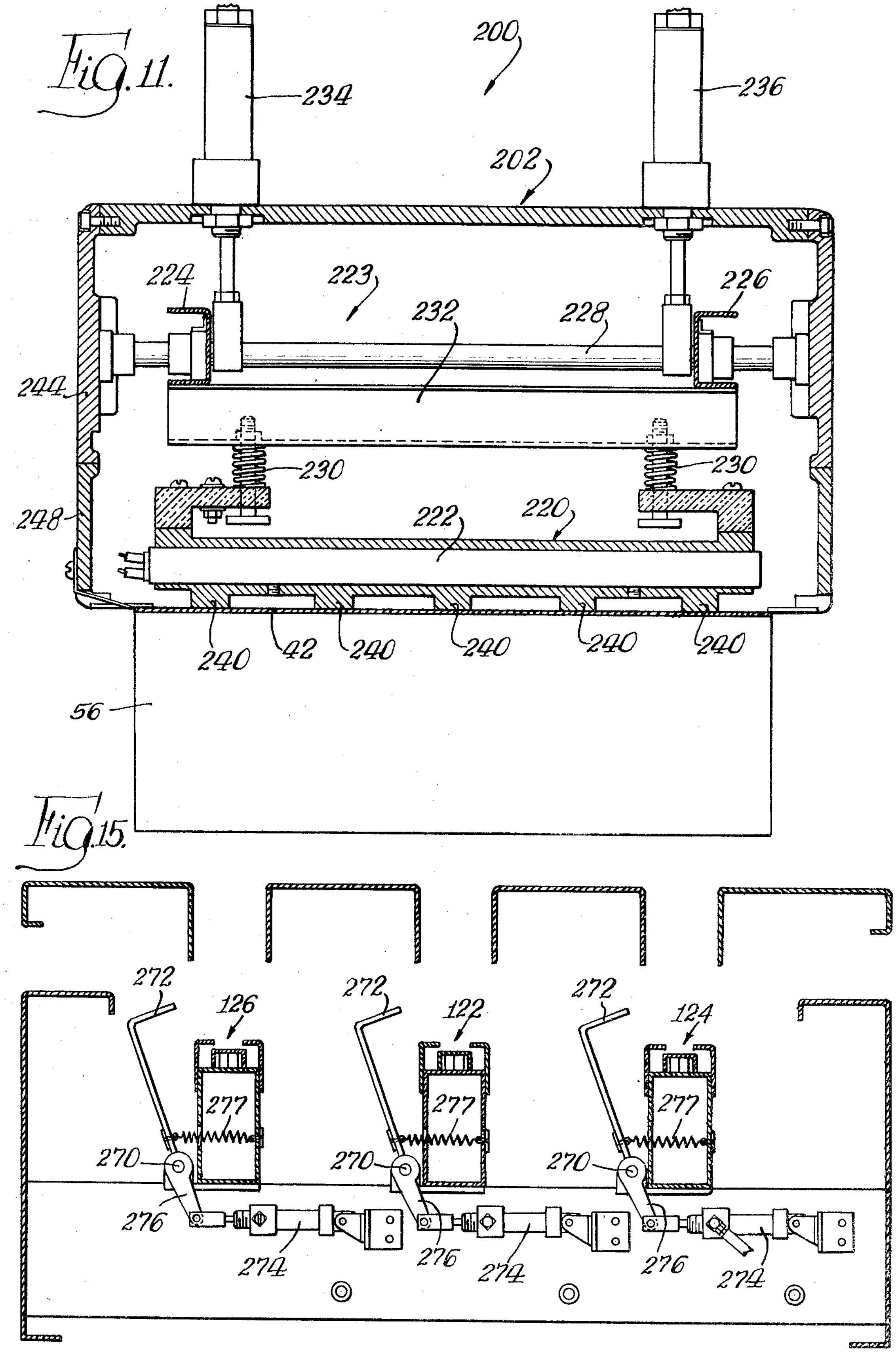
Figure 12:
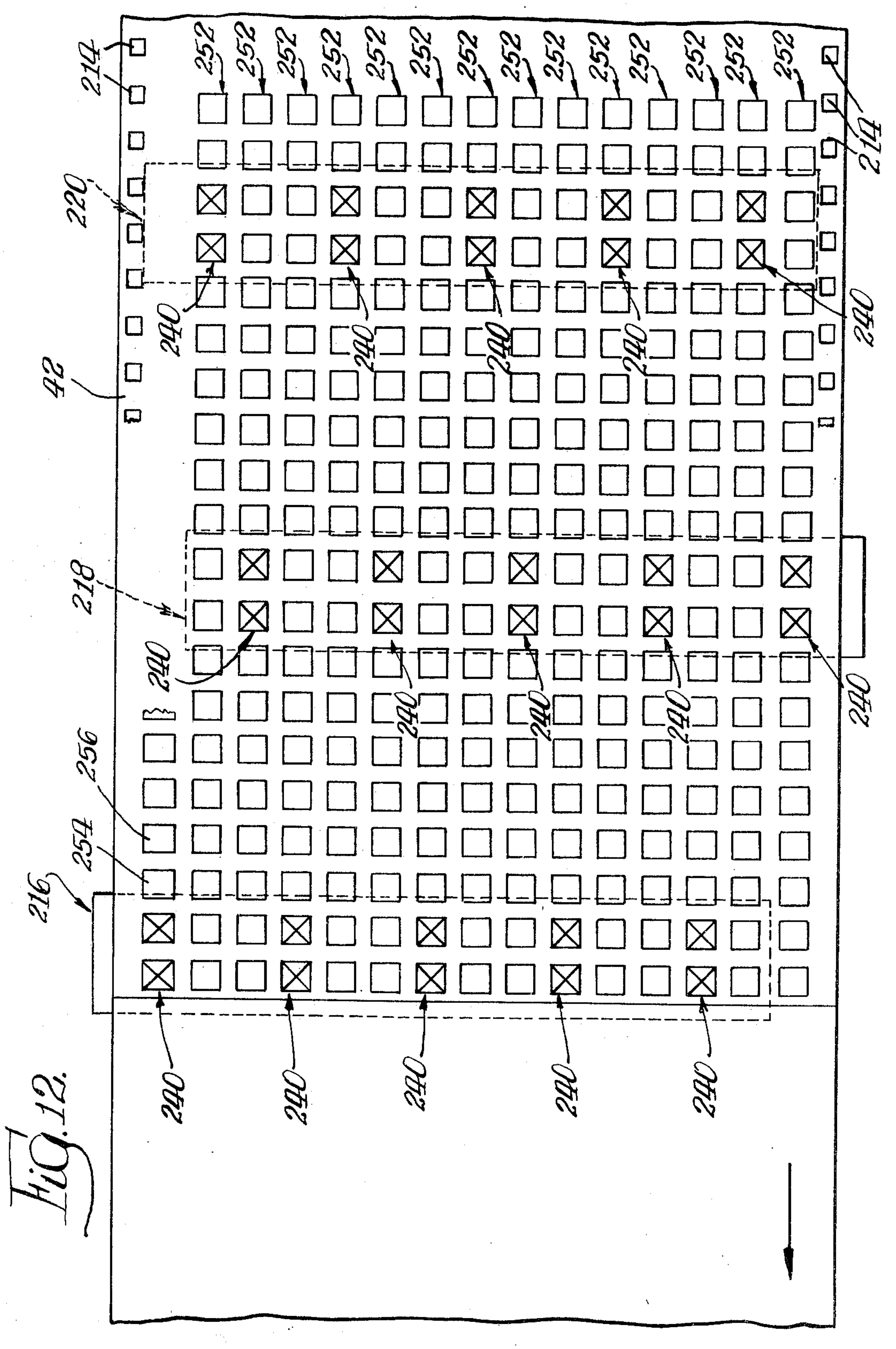
Figures 13, 14:
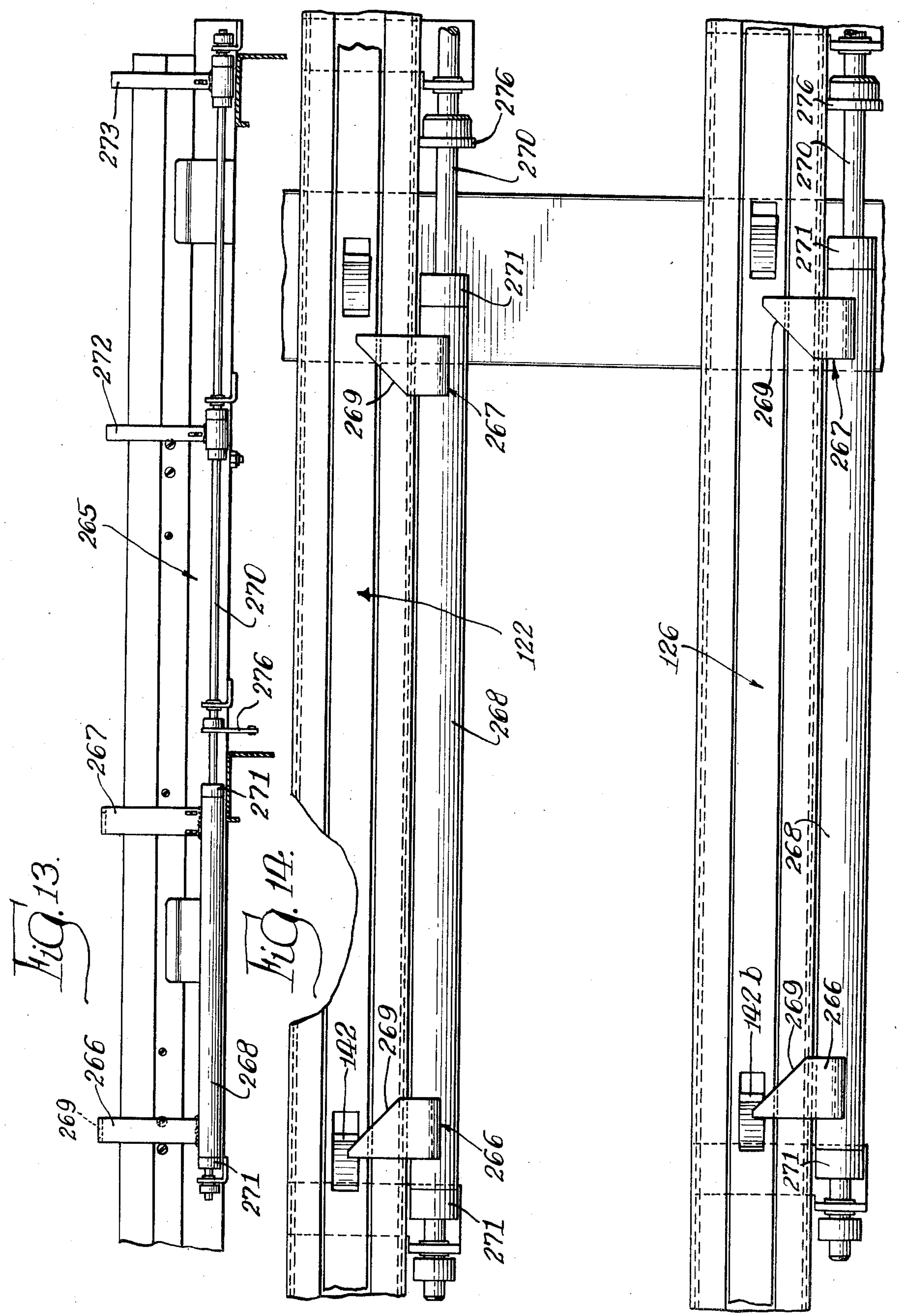
Figures 16, 17:
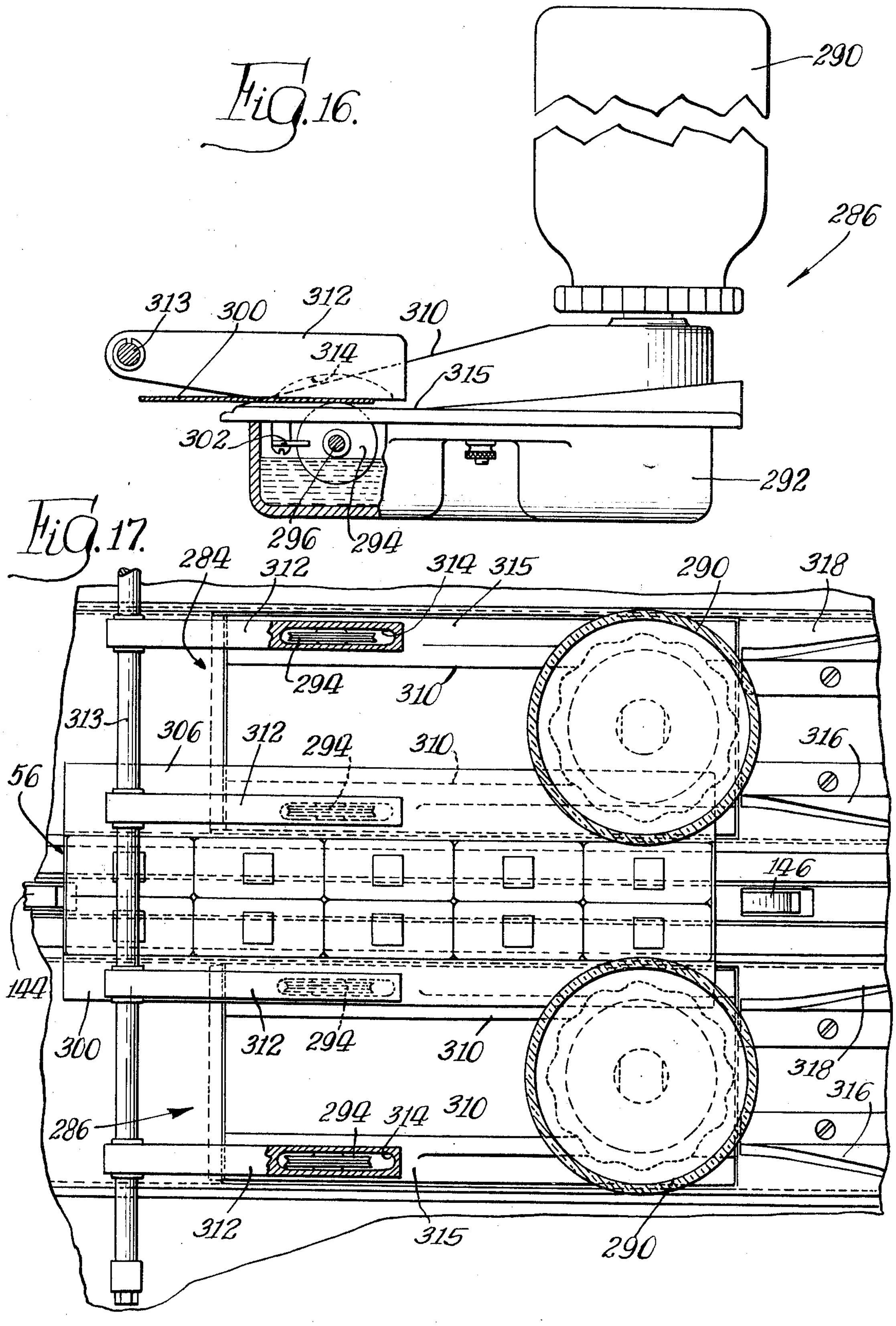
Figures 18, 19, 20:
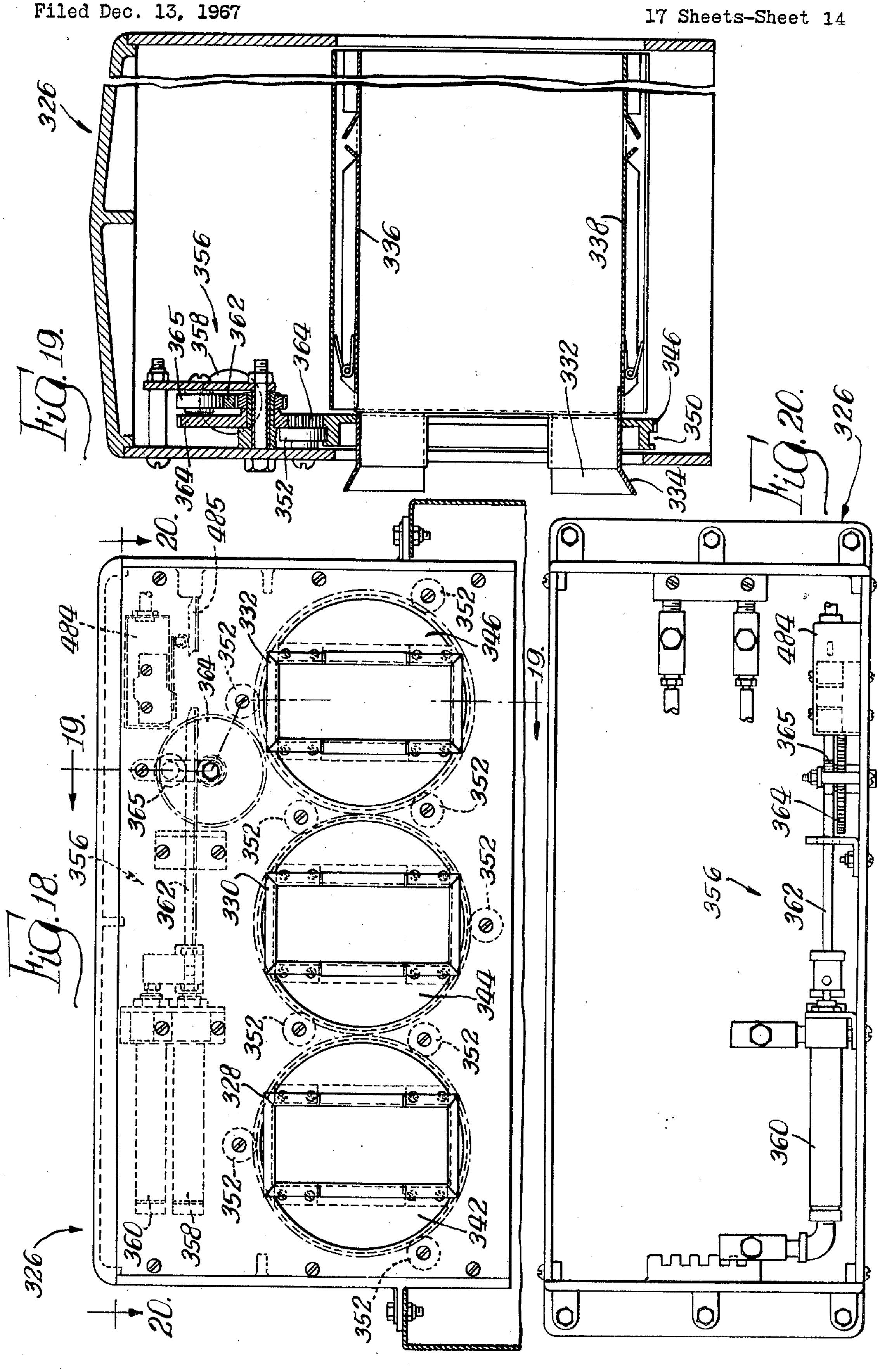
Figure 22:
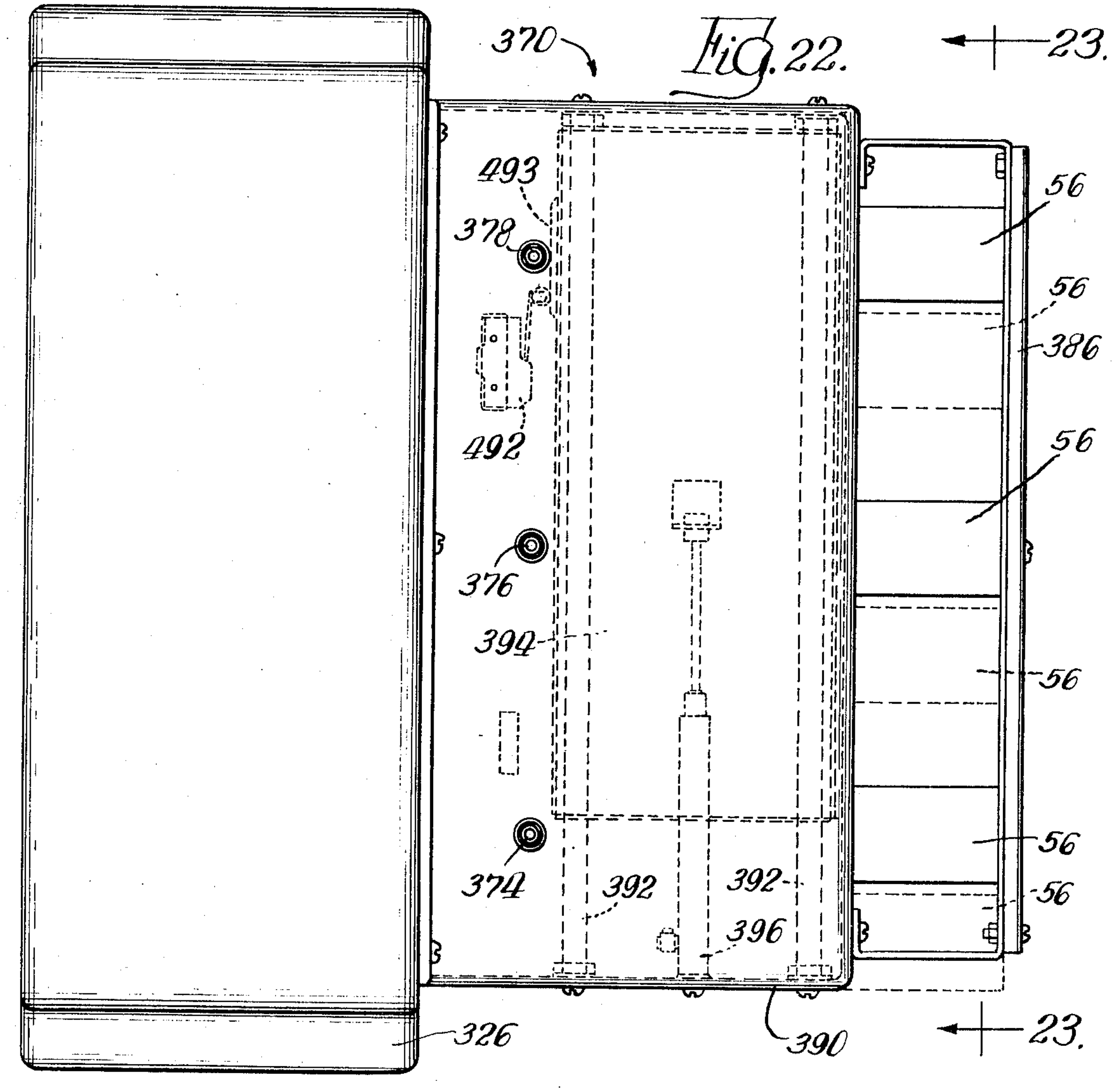
Figure 21:
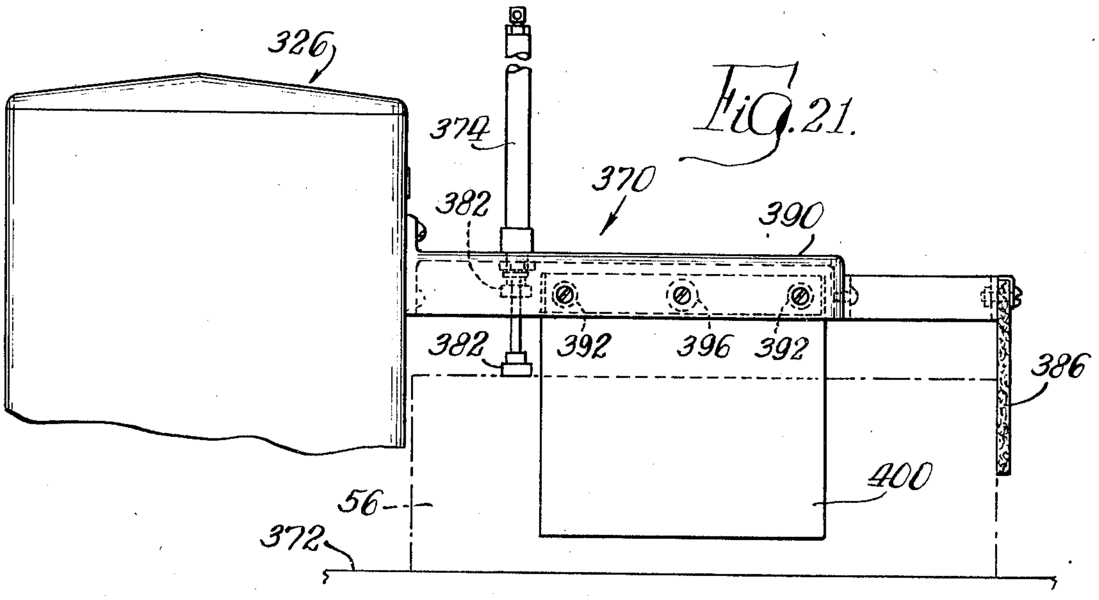
Figures 23, 24:
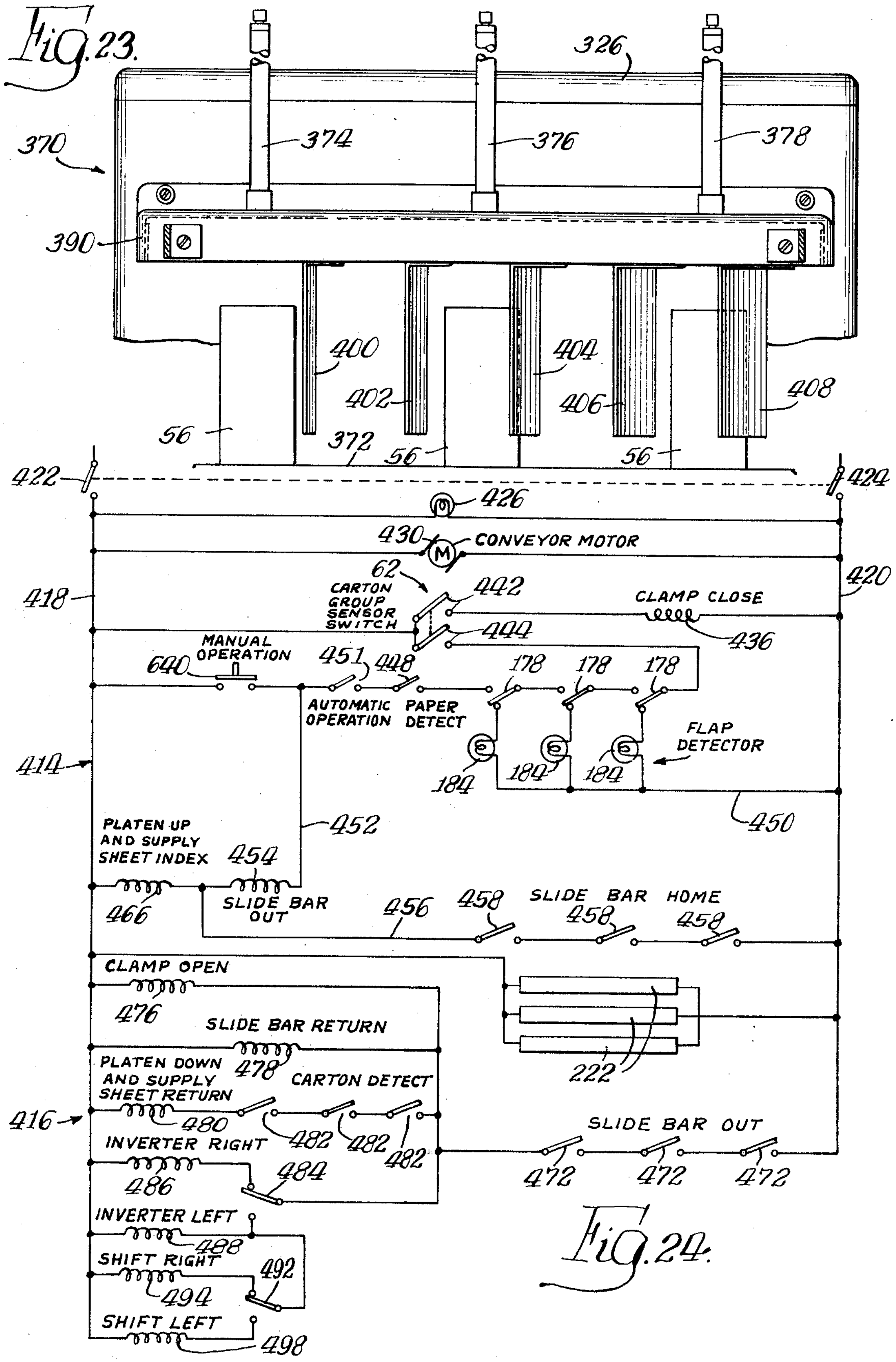
Figure 25:
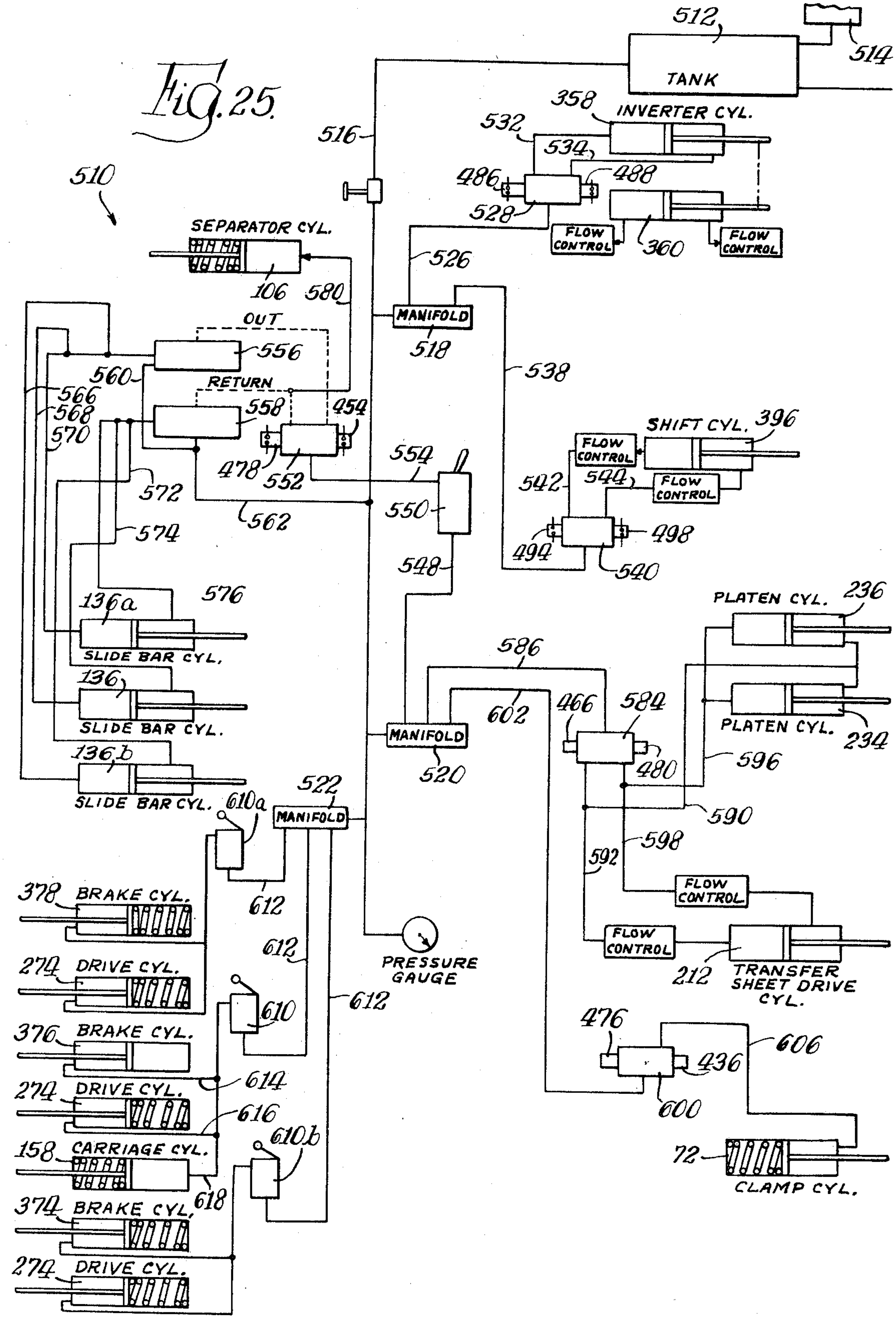

FIGS. 8*a* is a schematic illustration of the operation of an actuator assembly which is associated with a carton opener member;

FIG. 9 is an elevational sectional view, taken along the line 9—9 of FIG. 2*a*, illustrating the structure of a transfer applying apparatus or assembly;

FIG. 10 is a top plan view of the transfer applying apparatus of FIG. 9;

FIG. 11 is an elevational sectional view, taken along the line 11—11 of FIG. 9, illustrating the mounting of a transfer platen in the apparatus of FIGS. 9 and 10;

FIG. 12 is a schematic illustration showing the order of releasing of transfers from a transfer supply sheet or web by the transfer applying apparatus of FIGS. 9 through 11;

FIG. 13 is an elevational view of a carton centering and stopping assembly;

FIG. 14 is a plan view of a portion of the assembly of FIG. 13;

FIG. 15 is an enlarged sectional view taken along the line 15—15 of FIG. 2*b*, illustrating the relationship of a plurality of positioning or stop members relative to conveyor lines on which cartons or receptacles are transported;

FIG. 16 is an enlarged elevational view of an adhesive applicator assembly;

FIG. 17 is a plan view illustrating the application of adhesive to the narrow flap of a carton by the adhesive applicator assembly of FIG. 16;

FIG. 18 is an enlarged elevational view, taken along the line 18—18 of FIG. 2*b*, illustrating an inverter assembly for rotating cartons to position the cartons on their closure flaps after adhesive has been applied to the flaps in the manner illustrated in FIG. 17;

FIG. 19 is a sectional view taken along the line 19—19 of FIG. 18, further illustrating the structure of the inverter assembly;

FIG. 20 is a sectional view, taken along the line 20—20 of FIG. 18, illustrating a drive structure for the inverter assembly of FIGS. 18 and 19;

FIG. 21 is an elevational view of a shifter assembly located forwardly or downstream of the inverter assembly of FIGS. 18 and 19 for shifting a first group of closed cartons transversely while maintaining a spaced apart relationship between the cartons to enable a second group of cartons to be interspersed with the first group of cartons;

FIG. 22 is a top plan view of the shifter assembly of FIG. 21;

FIG. 23 is an elevational view, taken along the line 23—23 of FIG. 22, further illustrating the shifter assembly and a plurality of downwardly projecting or extending panels which engage the cartons to move them transversely of the inverter assembly of FIG. 18;

FIG. 24 is a schematic illustration of electrical control apparatus for the assembly of FIGS. 1 through 23; and FIG. 25 is a schematic illustration of pneumatic drive apparatus which is used in connection with the electrical control apparatus of FIG. 24.

GENERAL DESCRIPTION

Figure 1:
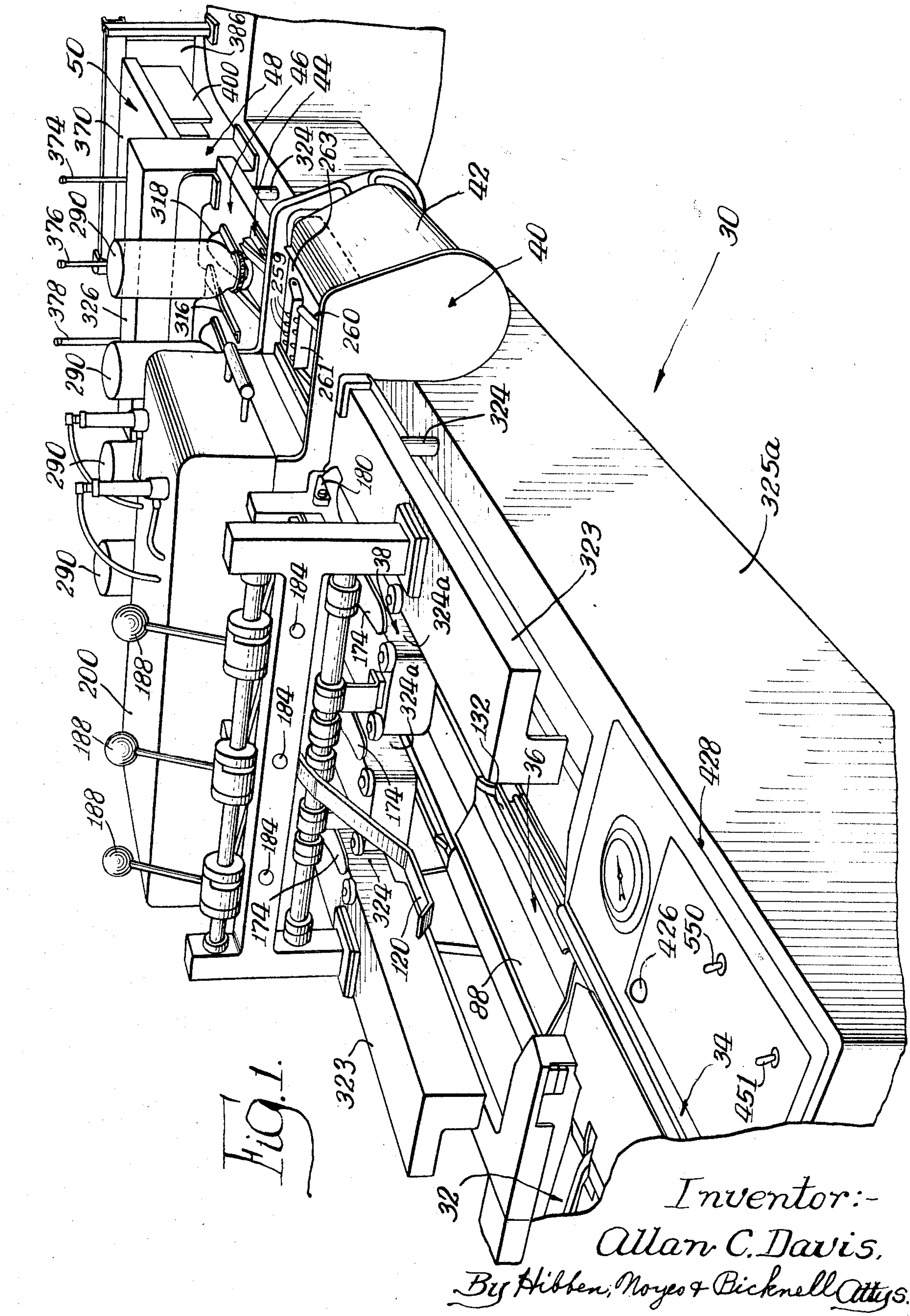

An apparatus or assembly 30 for opening cartons or receptacles of cigarettes and applying tax stamps or transfers to articles or packages of cigarettes in the cartons and closing the cartons is illustrated in FIGS. 1, 2*a* and 2*b*. A shipping container of sixty cartons of cigarettes is opened at a receiving station (not shown) and the cartons of cigarettes are removed from the container and placed onto an input or loading conveyor 32 which transports the cartons or receptacles to a loading station or section 34 of the assembly 30. The cartons are moved, with their longitudinally extending side surfaces in abutting engagement, from the loading station or section 34 in groups of a predetermined number, in the present embodiment of the invention in groups of three, to a separator or spreader station or section 36. The cartons forming each group are spaced apart from each other at the spreader or separator station for engagement with a conveyor which moves the group of cartons to a carton opening station or section 38. The group of cartons are contemporaneously opened, at the station 38, by pivoting adhered closure flaps of the cartons outwardly to expose a plurality of packages of cigarettes in the cartons. It should be noted that if the cartons had not been spaced apart relative to each other at the separator station 36, the closure flaps on the cartons would interfere with each other as the flaps are contemporaneously pivoted outwardly at the carton opening station 38.

The opened cartons are conveyed to a stamp or transfer application section or station 40 where tax stamps or transfers are contemporaneously applied to a center portion of each of ten packages of cigarettes in each carton. The transfers are contemporaneously applied to the packages of cigarettes from a single transfer or stamp supply sheet or web 42 which is best seen in FIG. 12. After the transfers have been applied to the packages of cigarettes, the group of cartons is moved to an adhesive application section or station 44 where adhesive is applied to a surface of one of the carton closure flaps. After the adhesive is applied to one of the closure flaps, the cartons are moved to a closing station or section 46 where the closure flaps are pivoted inwardly into abutting or overlapping relationship to close the cartons of stamped cigarette packages. Next the closed cartons of cigarettes are conveyed to an inverter station or section 48 where the cartons are rotated 180 degrees to position the closure flaps downwardly so that the weight of the cartons presses the flaps together to insure a secure interconnection of the flaps by the adhesive which was previously applied at station 44.

The inverted cartons are then transferred to a shifting or accumulator station or section 50 where the first group of cartons is shifted transversely relative to the inverter station or section 48 while maintaining the spaced apart relationship between the cartons. A next succeeding or second group of cartons will be interspersed or interleaved with the first group of cartons to form a column or row of six cartons. The column or row of six cartons is then repacked in the shipping container which is sized to receive sixty cartons in ten rows or columns of six cartons each. Although the shipping container can be repacked by hand or by any desired packing apparatus, it is intended that the assembly or apparatus 30 will advantageously be used with a packing apparatus similar to that set forth in my application Ser. No. 666,521 entitled "Packer Assembly" and filed on Sept. 8, 1967.

In view of the foregoing remarks it is apparent that the assembly or apparatus 30 segregates the receptacles or cartons of cigarettes into groups of a predetermined size and transports each group to the separator or spreader station 36 where the cartons are spaced transversely apart relative to each other. The cartons are then transferred as a group to the opening station or section 38 where they are all opened at substantially the same time to expose packages of cigarettes within the cartons. The open cartons are moved to a stamp or transfer application station or section 40 where tax transfers are applied at substantially the same time to a center portion of each of the plurality of packages of cigarettes in each of the plurality of cartons forming the group of cartons. After the tax transfers have been applied to the packages of cigarettes, the cartons are moved to an adhesive applicator section where a flap on each of the cartons is coated with adhesive so that the flaps will adhere to each other when they are moved into abutting engagement at the closing station or section 46. The closed cartons are conveyed to the inverter station 48 where they are rotated to set the cartons on the flaps to hold them in abutting engagement with each other. Next the cartons are moved to the shifter or accumulator station where one group of cartons is moved transversely sideways while maintaining the cartons in their spaced apart relationship so that a subsequent group of three spaced apart cartons can be interspersed with the first group of three cartons to form a row or column of six cartons. Finally the row or column of six cartons is packed in any desired manner into a shipping container. This packing of the cartons in the shipping container is facilitated since the cartons are in a relatively large row of six which can be easily packed in a shipping container intended to hold ten rows of six cartons.

LOADING APPARATUS

Figures 3, 4, 5:
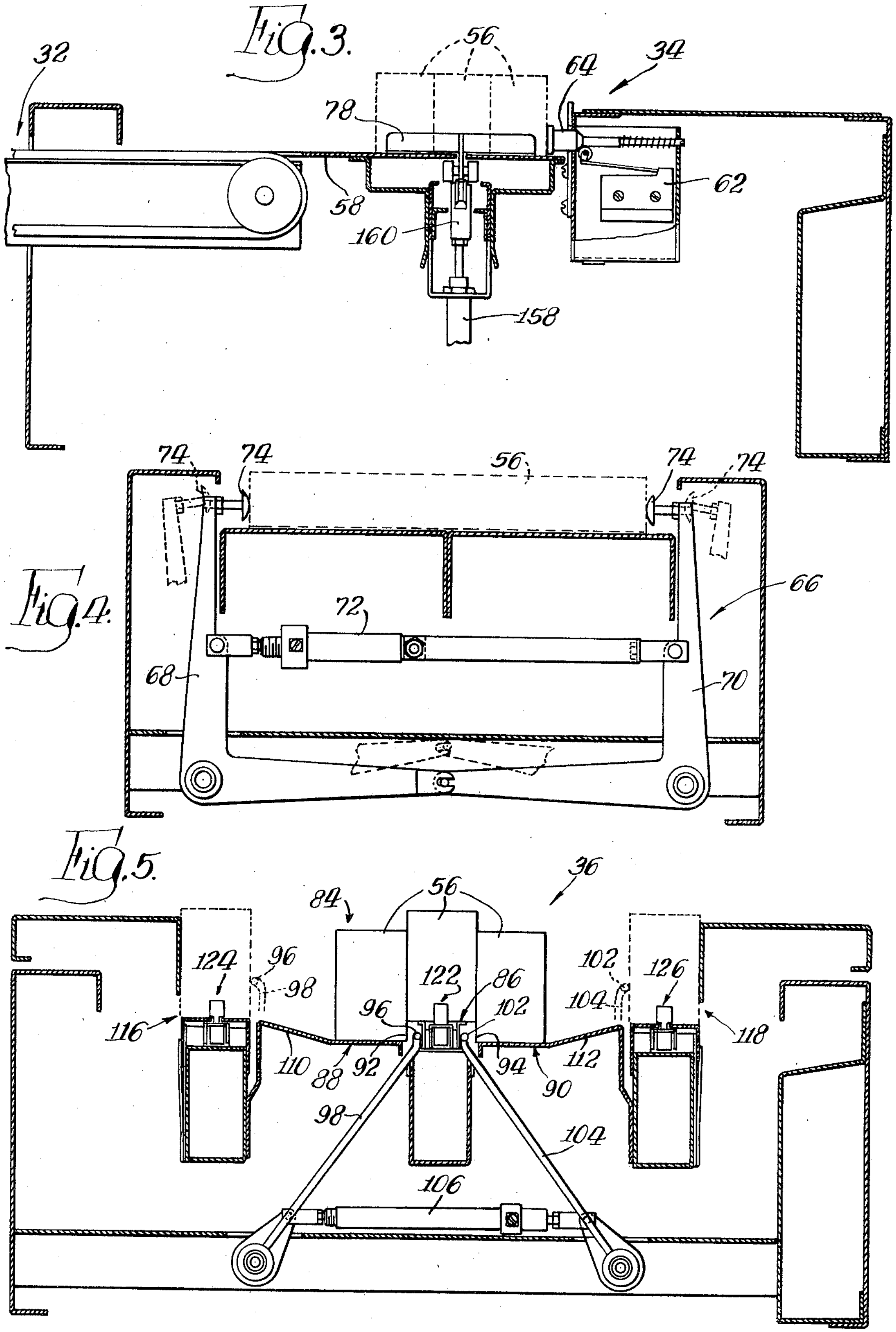
FIG. 3 is an enlarged sectional view, taken along the line 3—3 of FIG. 2*a*, illustrating the relationship of an input or loading conveyor to a loading station or section of the apparatus.
FIG. 4 is an enlarged sectional view, taken along the line 4—4 of FIG. 2*a*, illustrating a clamp assembly for engaging and holding a carton against movement relative to the loading station when a group or predetermined number of cartons is being moved from the loading station.
FIG. 5 is an enlarged sectional view, taken along the line 5—5 of FIG. 2*a*, illustrating the construction of a separator or spreader station at which cartons forming a group of cartons are moved from a juxtaposed or side-by-side relationship to a spaced apart relationship.

The receptacles or cartons of cigarettes, shown in dashed lines in FIGS. 2*a*, 2*b* and 3 and indicated by the numeral 56, are unpacked from shipping containers (not shown) and placed on the input or loading conveyor 32 with the longitudinal axes of the cartons extending transversely to the conveyor. It should be noted that, in accordance with a feature of the present invention, the cartons are positioned on the conveyor 32 with their closure flaps positioned upwardly and in any one of a plurality of orientations, that is the cartons can be oriented with a longitudinally extending outer edge of the closure flaps on either the left or the right side of the carton as long as the carton is positioned with the flaps upwardly. The cartons 56 are transported, with their closure flaps upwardly, to a loading platform 58 at the loading station 36 by the conveyor 32. When a group of three cartons is located on the loading platform 58, a sensor or detector switch assembly 62 is actuated by engagement of the cartons with a plunger or operator member 64.

Actuation of the sensor switch assembly 62 completes a circuit for operating a clamp assembly 66 (see FIG. 4) which holds a carton next adjacent to the group of cartons on the loading platform 58 against movement relative to the loading platform as the group of cartons is moved off the loading platform. The clamp assembly 66 includes a pair of generally L-shaped rocker arms or levers 68 and 70 which are pivoted inwardly by a drive or clamp cylinder 72 from a normal position shown in dashed lines in FIG. 4 to a clamping or retaining position shown in solid lines in FIG. 4. The pneumatically operated clamp cylinder 72 has an internal return spring biasing it toward the normal position. When the clamp cylinder 72 is operated, a pair of opposite heads or pads 74 at the outer upper ends of the levers 68 and 70 are moved into clamping engagement with opposite ends of a carton of cigarettes 56 which is next to the group of three cartons which actuated the sensor switch assembly 62. The clamp assembly 66 holds the next or fourth carton against movement as the group of three cartons on the loading platform 58 is moved forwardly or downstream by a pull bar 78.

The pull bar 78 is shown in dashed lines in an initial or home position in FIG. 2*a* and in solid lines in a loading or retracted position. As the pull bar 78 is moved forwardly from the initial position to the loading position, the group of three cartons on the loading platform is moved longitudinally from the loading station 34 to the separator station 36. The pull bar 78 forms a part of a conveyor assembly having three conveyor lines with separate slide bars, that is one slide bar for engaging each of the three receptacles or cartons forming a group of cartons. Thus, each of the three cartons of a group of cartons is engaged at the separator station 36 by a slide bar forming a part of a longitudinally extending conveyor assembly.

In view of the preceding remarks it is apparent that the cartons of cigarettes are placed on the conveyor 32 with their closure flaps positioned upwardly in any one of a plurality of orientations, that is with the relatively large outer closure flap extending either upstream or downstream of the conveyor 32. When a predetermined number of cartons, in the present example, three, have been accumulated at the loading station 34, the sensor switch assembly 62 is actuated. Actuation of the sensor switch assembly 62 energizes control circuitry to move the group of cartons from the loading platform and to move the clamp assembly 66 into engagement with the fourth carton, that is the carton immediately adjacent to the group of three cartons at the loading station 34. The clamp assembly 66 holds the fourth carton against movement as the group of three cartons on the loading platform is moved by the pull bar 78 from the loading station 34 to the separator station 36.

SEPARATOR OR SPREADER APPARATUS

The group of three cartons is moved in a side-by-side or juxtaposed relationship to the separator station 36 where the cartons are spaced laterally apart from each other to provide room between the cartons to facilitate the performing of various operations by the apparatus or assembly 30. The cartons 56 are positioned in a side-by-side relationship by the pull bar 78 at an intermediate or center section 84 (see FIG. 5) of the separator station 36. Although the three cartons forming a group of cartons are positioned with their longitudinally extending side surfaces in juxtaposition, the center carton of the three cartons is vertically offset relative to the two side cartons. This offset relationship results from a positioning of the center carton on a medial or center portion 86 of the intermediate section 84 while the two outer or side cartons are positioned on depressed or lower side portions 88 and 90 of the intermediate section 84. This offset relationship between the cartons of a group of cartons exposes oppositely facing inner surfaces of the two outer cartons, as indicated at 92 and 94 in FIG. 5. The inner surface 92 is engaged by a longitudinally extending outer end section 96 of a pivotally mounted separator arm or lever 98. Similarly, the inner surface 94 of the opposite outer carton is engaged by an outer end section 102 of a pivotally mounted separator arm or lever 104. A drive cylinder 106 is mounted between the separator arms 98 and 104 and is operated by air pressure to pivot the arms 98 and 104 outwardly from a normal or initial position, shown in solid lines in FIG. 5, to an operated or separating position, shown in dashed lines in FIG. 5. During this outward pivoting movement of the arms 98 and 104 the two outer cartons are moved up a pair of inclined ramps 110 and 112 from the intermediate section 84 to a pair of opposite side sections 116 and 118 which are at the same elevation as the center portion 86. The center carton is stabilized by a pivotally supported weight 120 (FIG. 1) to hold the center carton from falling over as the two outer cartons are moved outwardly.

When the outer cartons are located at the side sections 116 and 118 and the center carton is positioned on the medial portion 86 of the separator station 36, the two outer cartons are spaced apart from the center carton by equal transverse distances. The center carton is located in engagement with a center slide bar assembly 122 and the two outer cartons are now positioned in engagement with outer slide bar assemblies 124 and 126. The slide bar assemblies 122 through 126 are simultaneously reciprocated to move the group of cartons in a longitudinal direction while maintaining the spaced apart relationship between the cartons. Although three slide bars, which are moved at the same time, are provided for transporting the cartons as a group relative to the assembly or apparatus 30, it will be apparent to those skilled in the art that a single wide conveyor could be provided for moving the cartons relative to the apparatus 30.

The center slide bar assembly 122 is essentially the same in structure as the two outer or side slide bar assemblies 124 and 126. However, the center slide bar assembly 122 differs from the structure of the outer slide bar assemblies 124 and 126 by the provision of a connector arm 130 which attaches the pull bar 78 to a longitudinally extending central frame 132 of the center slide bar assembly 122 (see FIG. 6). Therefore, only the slide bar assembly 122 will be described in detail, it being understood that the slide bar assemblies 124 and 126 are similar in structure to the slide bar assembly 122.

The frame 132 of the slide bar assembly 122 is connected to a rod or shaft 134 of a piston and cylinder assembly 136 by a connector block 138. Air is conducted under pressure to the piston and cylinder assembly 136 to reciprocate the frame 132 of the slide bar assembly 122 back and forth in a longitudinal direction. As frame 132 is reciprocated, spring-loaded and pivotally mounted dogs or pawls 140 through 148 engage and advance cartons sequentially to the work stations of the apparatus 30. The piston and cylinder assembly 136 has a stroke which is sufficient to move the pull bar 78 from the initial or home position, indicated in dashed lines at 150 in FIG. 6, to the loading or retracted position indicated in dashed lines at 152 in FIG. 6. Of course, during each stroke of the piston and cylinder assembly 136, a group of cartons is moved by the pull bar 78 from the loading station 34 to the separator station 36. When the pull bar 78 is at the loading position shown in dashed lines at 152 in FIG. 6, the pull bar clears the forward end of the loading platform 58 and falls downwardly under the influence of gravity to the position shown in solid lines in FIG. 6. When the frame 132 of the slide bar assembly 122 is moved rearwardly by the piston and cylinder assembly 136, the pull bar 78 moves under the loading platform 58 from the loading position (indicated at 152) to the home position (indicated at 150). By moving the pull bar 78 under the loading platform 58 in this manner, the pull bar passes beneath the next succeeding group of cartons which is being moved onto the loading platform 58 by the supply conveyor 32.

Figure 6:
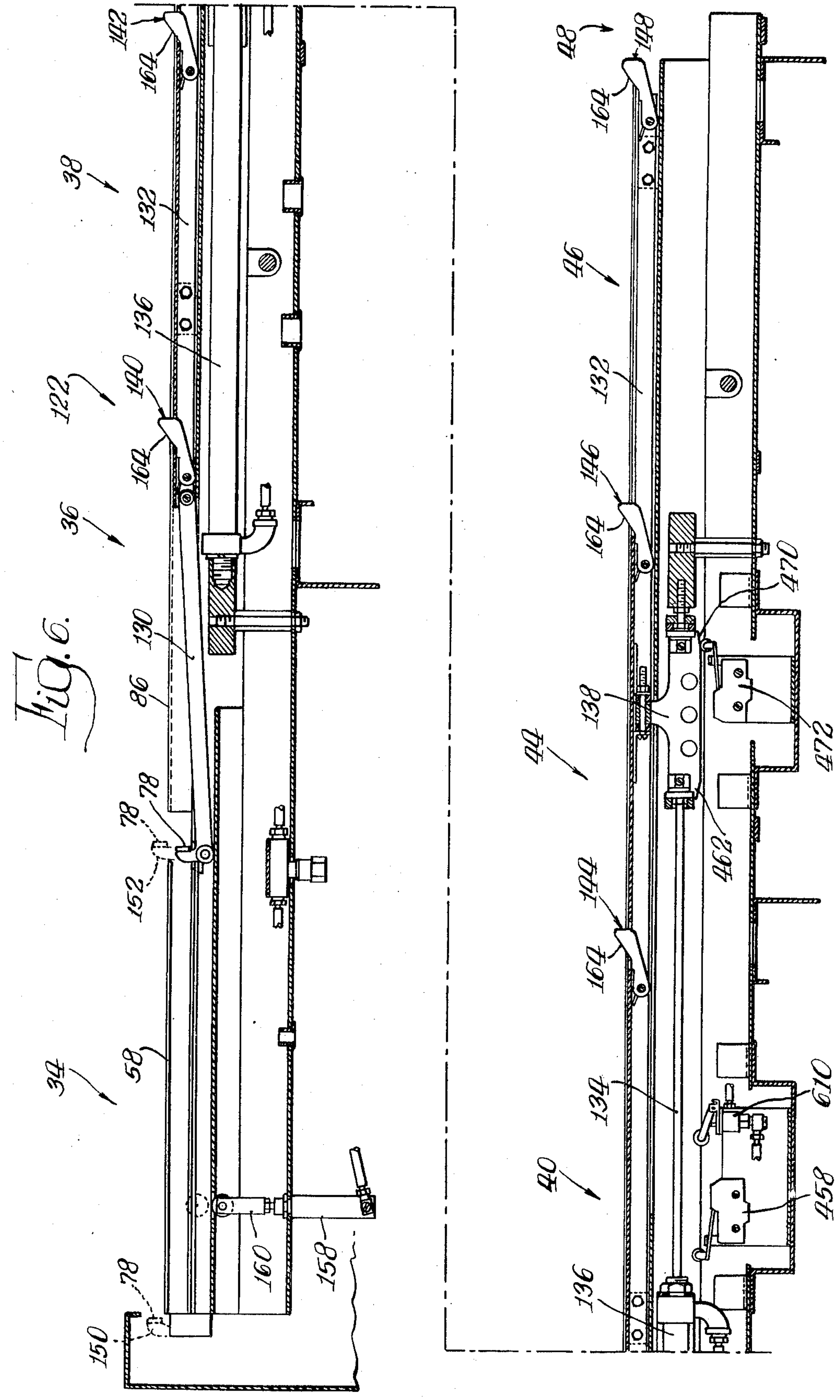
FIG. 6 is an elevational sectional view, along the line 6—6 of FIGS. 2*a* and 2*b*, illustrating the construction of the center slide bar conveyor assembly.

When the pull bar 78 has been moved to the home position, at 150 in FIG. 6, a carriage cylinder 158 is operated by pneumatic pressure to lift a carriage 160 and the pull bar 78 upwardly. As the carriage 160 moves upwardly, the connector arm 130 passes through a slot 161 (FIG. 2*a*) in the loading platform 58 and the pull bar 78 is positioned above an upper surface of the loading platform 58. The pull bar 78 is then positioned to engage and move a next succeeding group of cartons from the loading station 34 of the assembly to the separator station 36. As the frame 132 and pull bar 78 are moved or indexed forwardly by the piston and cylinder assembly 136, the drive dogs 140 through 148 move cartons engaged by forward surfaces of the dogs to a next longitudinally forward station of the apparatus 30 (see FIGS. 2*a*, 2*b* and 6). Thus, when the slide bar assembly 122 moves forwardly, the dog 140 moves a carton from the separator station 36 to the carton opening station 38 while the dog 142 moves a carton from the opening station 38 to the transfer application station 40. In addition, the drive dog 144 moves a carton from the transfer application station 40 to the adhesive application station 44 as the dog 146 moves a carton from the adhesive application station 44 to the closing station 46. The end drive dog 148 moves a carton from the closing station 46 to the inverter station 48. When the piston and cylinder assembly 136 is actuated to move the slide bar assembly 122 back from the loading position to the initial or home position, rearward cam surfaces 164 on the dogs 140 through 148 engage the next adjacent rearward or downstream cartons which pivot the spring-loaded drive dogs downwardly so that the cartons are retained in the positions which they were previously moved to during the forward motion of the slide bar assemblies.

The outer slide bar assembly 124 includes pivotally mounted dogs or pawls **140*a* through 148*a* which engage and move cartons in the same manner as do the dogs 140 through 148 of the slide bar assembly 122. Similarly, the slide bar assembly 126 includes dogs or pawls 140*b* through 148*b* to advance cartons on the opposite side of the slide bar assembly 122. The slide bar assemblies 122, 124 and 126 are reciprocated at the same time to advance the cartons 56 in groups of three. Thus, groups of three cartons are separated at the station 36 and are moved through the apparatus 30 past each of the work stations in turn by the simultaneous reciprocation of the three slide bar assemblies 122, 124 and 126**.

OPENING STATION

After a group of cartons has been separated at the station 36, the cartons are moved by the slide bar assemblies 122, 124 and 126 to the carton opening station 38. The closed cartons are opened at the station 38 to expose a plurality of packages of cigarettes in each of the cartons. As the cartons are moved from the separator station 36 to the carton opening station 38 they are engaged by a plurality of soft rubber rollers 168 (see FIG. 2*a*) which are located on opposite sides of each of the slide bar assemblies. The rollers 168 engage opposite side surfaces of the cartons and squeeze the sides of the cartons together to bulge the adhered top closure flaps of the cartons upwardly. This upward bulging of the closure flaps provides a space between an upper end portion of the transversely extending end walls of the cartons and the closure flaps. Tapered end portions 172 of a plurality of generally wedge shaped opening members or horns 174 (see FIGS. 7 and 8 taken in connecton with FIG. 2*a*) are contemporaneously inserted into the space between the transversely extending end walls and the closure flaps to break the adhesive connection between the closure flaps and pivot the closure flaps on each of the cartons outwardly as the cartons are moved relative to the opening members 174 by the slide bar assemblies 122 through 126.

Each of the opening members 174 includes a pair of arcuate transversely outwardly extending curls or wings 175 and 176 which engage the flaps on a carton as the flaps are moved upwardly by the tapered end portion 172 of the opening member 174. The opening members 174 are generally symmetrical in shape, that is the outwardly extending curl or wing 175 has the same shape or configuration as the outwardly extending curl or wing 176. This generally symmetrical shape of the opening members 174 enables the opening members to open a carton with the flaps of the carton in any one of a plurality of positions. Thus, the opening members of 174 can open a carton having its upper relatively large flap extending toward the left or toward the right, as viewed in FIG. 7. This versatility of the opening members 174 allows the cartons to be positioned on the conveyor 32 with a minimum of effort as they are withdrawn from a shipping container. It should be noted that the transverse spaced apart relationship which was provided between the cartons at the separator station 36 enables the flaps on a group of cartons to be contemporaneously pivoted outwardly without interference between the flaps. If the cartons had been maintained closely adjacent to each other, that is in the orientation in which they were moved into the separator station 36 from the loading station 34, the carton flaps could not be contemporaneously pivoted outwardly without having interference between the flaps.

Figure 7:
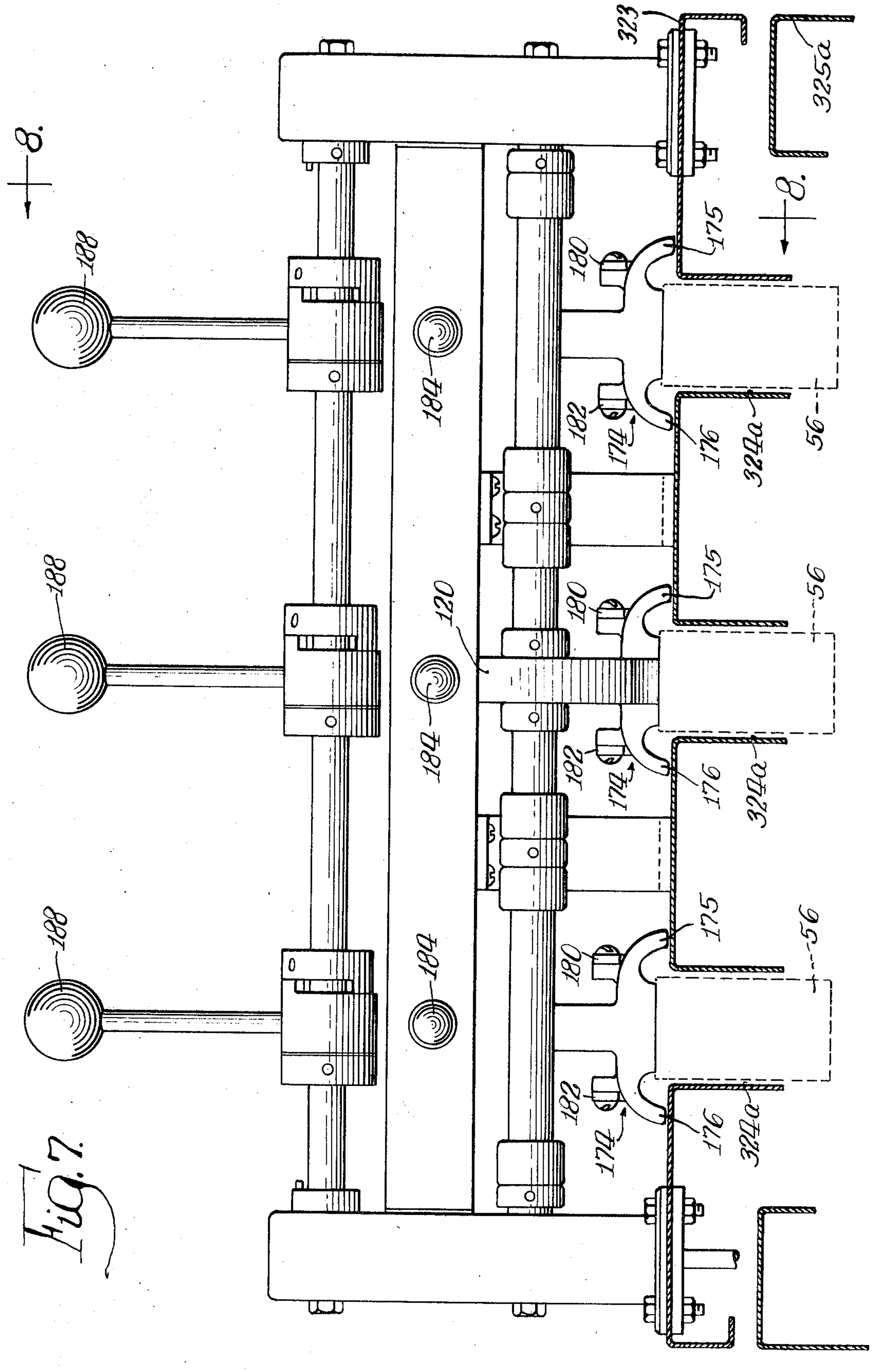
FIG. 7 is an elevational sectional view, taken along the line 7—7 of FIG. 2*a*, illustrating the relationship of a plurality of opener members to a plurality of receptacles or cartons at a carton opening station or section.

As is perhaps best seen in FIGS. 8 and 8*a* taken in connection with FIG. 7, each of the opening members 174 includes a switch 178 having a switch arm 179 and a pair of pivoted actuators or detectors 180 and 182 which are located on opposite sides of the opening members 174. The actuators 180 and 182 are engaged by the flaps on a normally opened carton 56 to operate the associated switch 178 by lifting a bar or rod 183 extending between and having swivel connections at 181 and 185 with the actuators 180 and 182 (see FIG. 8*a*). If one of the closure flaps on a carton fails to open, one of the actuators 180 or 182 will not be moved by engagement with the flap. The bar 183 will then be tilted about its central transverse axis at the point of contact with the switch arm 179, and the switch 178 will not be operated by lifting the bar 183 upwardly. When the switch 178 is in an unoperated position, a signal light 184 is energized and a control circuit for the slide assemblies 122 through 126 is open to prevent movement of the cartons past the station 38.

When one of the flaps of a carton fails to pivot outwardly to the open position, the associated opener member 174 can be pivoted upwardly from a normal operating position, shown in solid lines in FIG. 8, to a release position, shown in dashed lines in FIG. 8, by pivoting an actuator handle 188 downwardly. This downward movement of the handle 188 pivots a support frame 190 and a connector link 192 upwardly to move the opening member 174 through an arc extending generally parallel to a longitudinal axis of the cartons 56 and the slide bars 122 through 126. When the opening member is pivoted to the released position shown in dashed lines, it is a relatively easy matter to manually pivot the flaps of an improperly opened carton to the open position to expose the packages of cigarettes within the carton.

TRANSFER APPLICATOR APPARATUS

Tax stamps or transfers are contemporaneously applied to packages of cigarettes in an open group of cartons by a transfer applicator assembly 200 (see FIGS. 9 through 11) when the open group of cartons are located at the transfer application station 40. The transfer application assembly 200 includes a housing or casing 202 which extends transversely across the three conveyor lines of the assembly 30. The housing 202 has an end section 204 which encloses a roll 206 from which the transfer supply sheet 42 extends transversely across the conveyor lines to a take up roll 208 and thence extends downwardly to a collection bin (not shown) or the like for receiving the transfer-free supply sheet. The roll 208 is rotated, in a counterclockwise direction as viewed in FIG. 9, upon operation of a ratchet mechanism 210 by a drive cylinder 212. As the roll 208 is rotated by the drive cylinder and ratchet mechanism, the transfer supply sheet 42 is indexed or moved transversely across the conveyor lines for the cartons 56 by engagement of pegs (not shown) on the roll 208 with perforations 214 (FIG. 12) along the edge of the transfer supply sheet. This movement of the transfer supply sheet 42 positions tax stamps or transfers on the supply sheet relative to the tops of exposed packages of cigarettes in the previously opened cartons.

The transfer supply sheet 42 is of a structure which is well known per se and includes a paper web or base sheet having a wax coating on which the tax transfers are printed. A heat activatable or thermoplastic adhesive layer is provided on an outer surface of the transfers to adhere the transfers to a package of cigarettes. The transfer applicator assembly 200 includes a plurality of platens 216, 218 and 220 having electrical heating elements, indicated at 222 in FIG. 11, which melt the heat release layer of wax and activate the adhesive to release the transfers from the supply sheet 42 and to contemporaneously therewith secure the transfers to the packages of cigarettes in the cartons 56.

The platens 216 through 220 are mounted on a frame 223 having a pair of frame members 224 and 226 (see FIGS. 9 and 11) which extend transversely across the conveyor lines and are pivotally mounted on a support bar 228. The platens 216 through 220 are resiliently connected by springs 230, as shown in FIG. 11, to support members 232 which extend between the frame members 224 and 226. A pair of platen actuator cylinders 234 and 236 are mounted on the housing 202 to press the platens downwardly against the transfer supply sheet 42 and packages of cigarettes by pivoting the frame members 224 and 226 about the support shaft 228. The casing 202 includes an upper section or cover 244 which is pivotally connected at 246 (see FIG. 9) to a lower section 248 to enable the cover to be pivoted upwardly by a handle 250 to a permit threading of a fresh transfer supply sheet through the machine and also to expose and facilitate maintenance or replacement of the platens.

When the frame 223 is pivoted about the support bar 228, the platens 216 through 220 are moved sequentially into engagement with the transfer supply sheet 42. The platen 216 is closest to the support bar 228 and will therefore be the first platen to engage the transfer supply sheet 42. The transfer supply sheet 42 will then be pressed downwardly against the packages of cigarettes in the carton 56 which is beneath the platen 216. Since the roll 208 is held against clockwise rotation (as viewed in FIG. 9) by the ratchet mechanism 210, a relatively short length of the transfer supply sheet 42 is unwound from the roll 206 as the platen 216 depresses the transfer supply sheet. As the pivoting movement of the frame 223 is continued, the platen 218 engages the transfer supply sheet 42 and presses the transfer supply sheet downwardly against the packages of cigarettes in the associated carton 56 while unwinding the roll 206 an additional slight amount. It should be noted that the springs 230 enable the pivoting movement of the frame 223 to be continued while a substantially constant downward pressure is exerted by the platens against the transfer supply sheet. Finally, the platen 220 is brought into engagement with the transfer supply sheet 42 and thereby unwinding another increment from the roll 206. This sequential engagement of the platens 216 through 220 with the transfer supply sheet enables a short length of slack to be provided in the transfer supply sheet between each of the platens. If the platens 216 through 220 were moved simultaneously into engagement with the transfer supply sheet 42, the transfer supply sheet would be torn. Although the platents are moved sequentially into engagement with the transfer supply sheet 42, it should be understood that an extremely short time period elapses between the engagement of the platen 216 with the transfer supply sheet and the engagement of the platen 220 with the transfer supply sheet so that the transfers are applied substantially contemporaneously to the packages of cigarettes in the three cartons 56. When the ratchet mechanism 210 is actuated upon completion of a stamping cycle, the sheet 42 which has been depressed by the platens against the cartons is tightened and pulled away from the packages of cigarettes as the next section of the sheet 42 is advanced into position for the next stamping cycle.

The transfer supply sheet 42 and platens 216 through 220 are shown schematically in FIG. 12. Each of the platens 216 through 220 includes five operating sections 240 which project from the platen (FIG. 11). Each of the operating sections 240 has a pair of heads which engage separate tax transfers to apply two transfers to adjacent packages of cigarettes in each of the cartons 56. The transfers which are aligned with the operating heads of the sections 240 are indicated schematically with an $x$ in FIG. 12. Since there are five operating sections 240 on each of the platens and each operating section applies transfers to a pair of packages of cigarettes, each of the platens 216 through 220 can contemporaneously apply ten tax transfers to the ten packages of cigarettes which are normally enclosed within a carton. It should be noted that the platens 216 through 220 and the operating sections 240 are offset relative to each other so that each of the operating sections is associated with a particular longitudinally extending row of transfers, indicated at 252 in FIG. 12. Thus, each operating section 240 releases or applies transfers from a single longitudinal row of transfers to the packages of cigarettes immediately below the platen when the platens are moved downwardly by the drive cylinders 234 and 236.

Each time the drive cylinder 212 is actuated the transfer supply sheet 42 is indexed two spaces, to the left as viewed in FIG. 12, to move the next two adjacent transfers in a longitudinal row of transfers into position beneath an associated operating section 240 of a platen. Therefore, when the cylinder 212 is actuated the transfers indicated at 254 and 256 in FIG. 12 will move beneath the outer operating section 240 of the platen 216. In a similar manner, a pair of transfers in each of the adjacent longitudinally extending rows 252 of transfers will be moved into an application position immediately beneath the associated operating sections of the platens 216 through 220. Thus, each time the transfer supply sheet 42 is indexed or moved, tax transfers are moved into application positions immediately beneath the associated operating sections of the platens 216 through 220. Upon the next subsequent actuation of the cylinders 234 and 236, the hot platens 216 through 220 will be moved downwardly to release the transfers from the supply sheet and to secure the transfers to the thirty packages of cigarettes in the three cartons of a group of cartons. It will be noted that the number of platens corresponds to the number of cartons in a group and that the number of operating sections 240 of each platen corresponds to the number of pairs of cigarette packages which are stamped by each operating section. Moreover, the number of longitudinally extending rows 252 of transfers is an integral multiple (five, in this case) of the number of platens or cartons and is a different integral multiple (three, in this case) of the number of operating sections 240 on each platen. It will also be noted that transfers from immediately adjacent rows 252 are always applied to packages in different cartons.

When the first roll or sheet of transfers is installed in the machine, the tax transfers which are on the leading end of the transfer supply sheet 42 ahead of the operating sections of the two platens 218 and 220 will not be applied to packages of cigarettes, but this group of transfers can be utilized manually if desired. A splicer assembly 260 (see FIGS. 1, 9 and 10) is mounted on the transfer applying assembly 200 to connect the initial or leading end portion of a fresh transfer supply sheet to the final or trailing end portion of a preceding transfer supply sheet to insure continuous operation of the machine.

The splicer assembly 260 includes a pair of pivotally mounted arms 261 which are pivoted outwardly (as shown in FIG. 10) to align two transfer sheets, which are to be spliced together, by engaging a series of pegs 259 (FIG. 1) on the arms 261 with the perforations 214 in the two transfer supply sheets. The two aligned transfer supply sheets can then be interconnected with pressure sensitive tape applied through a slot 262 in a pivotally mounted pressure plate 263 on which the arms 261 are mounted. The plate 263 is pivotally connected to the casing 202 by a hinge 264. The hinge 264 enables the splicer assembly 260 to press downwardly on the transfer supply sheet 42. This downward pressure of the splicer assembly 260 provides sufficient frictional resistance to enable the transfer supply sheet 42 to be pulled taut by movement of the roll 208 each time the ratchet mechanism 210 is operated.

As was previously explained, the operating sections 240 of the platens 216, 218 and 220 are offset transversely relative to the longitudinally extending rows 252 of transfers to enable each of the operating sections 240 to be associated with one of the longitudinally extending rows 252 of transfers. If the three cartons forming a group of cartons were positioned in longitudinal alignment beneath the offset platens 216 through 220, only the transfers applied by the operating sections 240 of the platen 220 would be centered on the upper ends of the packages of cigarettes. The packages of cigarettes in a carton beneath the platen 218 would then have the transfers offset in a rearward direction from the center of the packages of cigarettes. The platen 216, on the other hand, would apply transfers to forward portions of the packages of cigarettes within the carton immediately beneath the platen.

In order that the transfers may be applied to the centers of the packages of cigarettes, the drive dogs on the slide bar conveyor assemblies 122 through 126 (see FIG. 2$a$) are offset longitudinally relative to each other at the transfer application station 40 to locate the cartons of a group of cartons in alignment with the respective offset platens 216 through 220. The drive dog 142$a$ (see FIG. 2$a$) of the slide bar assembly 124 is forward of the drive dogs 142 and 142$b$ for the slide bar assemblies 122 and 126. Therefore, a carton of cigarettes being conveyed or transported by the slide bar assembly 124 will lead the cartons of cigarettes conveyed by the slide bar assemblies 122 and 126. In FIG. 12 it can be seen that the operating sections 240 of the platen 216, which apply transfers to cartons of cigarettes transported by the slide bar conveyor assembly 124, are positioned ahead of the operating sections 240 for the platens 218 and 220. In a similar manner it can be seen from FIG. 2$a$ that the drive dog 142$b$ is located intermediate the drive dogs 142$a$ and 142. Thus, a carton of cigarettes being transferred by the slide bar assembly 126 will be positioned behind a carton of cigarettes transported by the slide bar assembly 124 and ahead of a carton of cigarettes transported by the slide bar assembly 122. This positioning of a carton of cigarettes by a slide bar assembly 126 is in accordance with the location of the platen 220 which has transfer sections 240 located behind the transfer sections 240 for the platen 216 and ahead of the transfer sections 240 for the platen 218. Finally, it can be seen in FIG. 2$a$ that the drive dog 142 for the center slide bar assembly 122 is the rearmost of the three drive dogs. Similarly, it can be seen in FIG. 12 that the operating sections 240 for the center platen 218 are rearwardly of the operating sections 240 for the platens 216 and 220.

The longitudinally offset relationship of the drive dogs 142, 142$a$ and 142$b$ locates the cartons 56 with the packages of cigarettes in the cartons in a centered relationship with the operating sections 240 of the platens 216 through 220. Therefore, transfers from the transfer supply sheet 42 are applied to a center portion of each package of cigarettes in each of the three cartons (see FIG. 15). If the cartons of cigarettes were not offset relative to each other to conform to the offset relationship of the platens 216 through 220, the transfers would not be centered on each package of cigarettes in each of the cartons. The drive dogs 140, 140$a$ and 140$b$ (FIG. 2$a$) which are immediately upstream from the drive dogs 142, 142$a$ and 142$b$, are only slightly offset relative to each other to facilitate engagement of the slide bar assemblies 122 through 126 with the cartons at the opening station 38. Similarly, the drive dogs 144, 144$a$ and 144$b$ (see FIG.

2*b*) are only slightly offset. The drive dogs 146, **146*a* and 146*b* are aligned with each other, as are the drive dogs 148, 148*a* and 148*b***.

A positioning assembly 265 (see FIG. 13) is mounted adjacent to each of the slide bar assemblies 122 through 126 to position cartons at the transfer application station 40, the adhesive applicator station 44 and the closing station 46. The positioning assembly 265 includes carton centering arms 266 and 267 which are mounted on a common tubular or cylindrical body 268 and have cam surfaces 269 for centering the cartons 56 relative to the platens 216 through 220. The body 268 is pivotally mounted on a shaft 270 and is held against longitudinal movement by adjustable positioning collars 271. By moving the collars 271 relative to the shaft 270, the position of a carton can be adjusted relative to an associated platen for applying transfers at a desired location on the packages of cigarettes in the cartons.

A stop arm 272 is pivotally mounted on the shaft 270 to stop or position cartons at the adhesive application station 44. Similarly, a stop arm 273 is pivotally mounted on the shaft 270 to stop or position cartons at the closing station 46. The shaft 270 is pivoted or rotated by a drive cylinder 274 (FIG. 15) to move the positioning assembly 265 from an out of the way normal position, shown in FIG. 15, to a blocking and centering position, shown in FIGS. 13 and 14. The drive cylinder 274 is connected to the shaft 270 by a bracket 276 which is fixedly connected to the shaft 270. However, the centering arms 266 and 267 and the stop arms 272 and 273 are pivotally mounted on the shaft 270. When the drive cylinder 274 is in the normal position shown in FIG. 15 the centering arms 266 and 267 and the stop arms 272 and 273 are pivoted outwardly by pins extending from the shaft 270. When the drive cylinder is operated, the shaft 270 is rotated and the centering arms and stop arms are urged toward the centering and blocking position by springs, similar to the springs 277 of FIG. 15. These springs resiliently urge the positioning assembly toward the centering and blocking positions and prevent damage to a carton which is adjacent to an end portion of a centering arm or a stop arm.

In view of the preceding remarks it can be seen that a group of cartons 56 are moved from a loading station 34 to a separator station 36 where they are moved transversely apart relative to each other. The cartons of packages of cigarettes are then moved longitudinally forwardly by reciprocation of the slide bar assemblies 122 through 126 to contemporaneously open the cartons with the wedge shaped opening members 174 to expose the packages of cigarettes. The slide bar conveyor assemblies 122 through 126 are then reciprocated for a second time and the cartons are moved forward and centered under the offset platens 216 through 220 of the transfer applicator assembly 200. The three platens are moved down at the same time by operation of the cylinders 234 and 236 to contemporaneously apply transfers from a single transfer supply sheet to center portions of all of the packages of cigarettes in the group of cartons, that is to apply transfers to thirty packages of cigarettes within three cartons.

ADHESIVE APPLICATOR AND CLOSURE APPARATUS

The group of cartons is moved from the transfer application station 40 to the adhesive application station 44 (see FIGS. 2*b* and 16) immediately after the tax transfers are applied to the packages of cigarettes in the manner previously explained. Adhesive is applied, at station 44, to one flap of each carton of stamped cigarette packages to enable the cartons to be resealed. The adhesive application station 44 includes a plurality of adhesive applicator assemblies 282, 284, 286 and 288 (see FIG. 2*b*) which are positioned adjacent to the slide bar assemblies 122 through 126. The adhesive applicator assemblies 282 through 288 are generally similar in structure and, as can be seen in FIG. 16, include a source or bottle 290 from which adhesive flows through a valve assembly to a reservoir or glue box 292. An adhesive applicator member or wheel 294 projects upwardly from the glue box 292 and extends downwardly into the liquid adhesive in the glue box. The wheel 294 is rotatable about a central axis 296 to apply adhesive to a surface of a flap of a carton, indicated at 300. Thus, as a group of cartons is moved from the transfer application station 40 to the adhesive application station 44 by the slide bar assemblies 122 through 126, adhesive is applied to flaps of the cartons by the applicator wheels 294 of the assemblies 282 through 288. A scraper member 302 is provided in each of the applicator assemblies for removing excess adhesive from the applicator wheel 294 as the wheel is rotated by engagement with the longitudinally moving flap 300 of an open carton.

Each carton of cigarettes is closed by a pair of closure flaps which adhere to each other, that is by a relatively small or narrow longitudinally extending flap 300 and a relatively large or wide longitudinally extending flap 306. The narrow flap 300 on a closed carton of cigarettes is normally positioned against the upper ends of the packages of cigarettes while the wide flap 306 overlaps and is secured to the narrow flap 300 by a layer of adhesive between an outer surface of the narrow flap 300 and an inner surface of the wide flap 306. As was previously explained, it is common practice in the industry to place advertising indicia on the outer surface of the wide flap 306. Since the narrow flap 300 is normally located inwardly of the wide flap 306, adhesive is applied to only the flap 300 by the adhesive applicator assemblies 282 through 288.

As is perhaps best seen in FIG. 17, taken in connection with FIG. 16, adhesive is applied to a lower surface of the outwardly extending narrow flap 300 of a carton of cigarettes by one of the applicator wheels 294. The relatively wide flap 306 is engaged by a cam surface 310 and lifted upwardly away from an opposite applicator wheel so that adhesive is not applied to the closure flap 306. A cam 310 is associated with each of the applicator wheels 294 of the applicator assemblies 282 through 288 (see FIG. 2*b*) to move the relatively large flaps 306 of the cartons of cigarettes away from the applicator wheels regardless of whether the relatively large flap 306 is located on the left, as shown in FIG. 17, or on the right. Thus, the cartons of cigarettes can be moved from the transfer application station 40 to the adhesive application station 44 with the cartons of cigarettes in any one of a plurality of positions, that is with the relatively large flap 306 extending outwardly from either the left or right hand side of the carton of cigarettes. The lower surfaces of the relatively narrow flaps 300 of a group of cartons are pressed downwardly against the associated applicator wheels 294 by positioning fingers 312 (FIGS. 2*b*, 16, and 17) which are pivotally supported from an upper cross-bar 313. The fingers 312 have upwardly extending pockets or recesses 314 (FIGS. 16 and 17) so that when a carton flap is not interposed between a finger 312 and a wheel 294, the finger seats against an upper surface 315 of the glue box 292 with the upwardly projecting portion of the wheel 294 extending into the recess 314. The wheel 294 is thus enclosed and the glue does not dry out by exposure to the air.

The cam or guide surfaces 310 are located transversely outwardly from an outer longitudinally extending edge portion of the narrow flaps 300 and do not engage the narrow flaps 300 to lift the flaps out of engagement with the applicator wheels 294. Thus, the cam or guide surfaces 310 act as sensors to detect the relatively wide flaps 306 of the open cartons of cigarettes and to hold the relatively wide flaps up out of engagement with the adhesive applicator wheels 294 while enabling the relatively narrow flaps 300 to engage the applicator wheels 294 under the action of the fingers 312. The use of the applicator wheels 294 and cam or guide surfaces 310 on opposite sides of the slide bar assemblies 122 through 126 enables the cartons 56 to be loaded onto the supply conveyor 32 and transported to the loading station 34 with the relatively wide outer flap 306 of a carton of cigarettes extending to either the right or to the left. This flexibility results from both the use of the opening members 174 (see FIGS. 7 and 8) which can open a carton whose flaps are extending in either direction and the use of the adhesive applicator assemblies 282 through 288 (see FIGS. 2*b*, 16 and 17) which selectively apply adhesive to only the narrow flap 300 of a carton.

At the end of the stroke of the slide bar assemblies 122 through 126 which moves the group of cartons from the transfer application station 40 to the adhesive application station 44, the cartons come to rest with their flaps open exposing the previously applied transfers on the packages of cigarettes in the cartons. At this time it is advantageous to visually inspect the packages of cigarettes to be sure that the transfers have been properly applied at the transfer application station 40.

On the next stroke or reciprocation of the slide bar assemblies 122 through 126, the group of cartons is advanced from the adhesive application station 44 to the carton closing station 46. The flaps 300 and 306 are engaged by longitudinally extending closure cams 316 and 318 which are positioned on opposite sides of the slide bar assemblies 122 through 126, as shown in FIG. 2*b*. The closure cams 316 and 318 engage a lower or under surface of the outwardly extending flaps and pivot or fold the flaps inwardly into abutting engagement in a well known manner. It should be noted that the relatively narrow flap 300 will, due to its small width, be positioned inwardly of the relatively wide flap 306 by either of the similar opposed closure cams 316 and 318. When the narrow closure flap 300 is pivoted inwardly from the open position shown in FIG. 17 to the closed position, the flap 300 is positioned against the packages of cigarettes with the coating of adhesive applied to the flap at the station 44 being disposed upwardly. The relatively wide flap 306 is then pivoted or folded downwardly against the layer of adhesive on the narrow flap 300 to interconnect the flaps 300 and 306 and seal the carton of stamped packages of cigarettes. As the group of cartons is moved rearwardly past the closure cams 316 and 318 the relatively wide closure flaps 306 on the cartons are engaged by resilient downwardly projecting springs 322 to press the closure flaps firmly together.

The carton opening members 174 (FIG. 7), the transfer applicator assembly 200 (FIG. 9), the adhesive applicator assemblies 282 through 288 (FIG. 2*b*), and the flap closure cams 316 and 318 are all mounted on a common frame or platform 323 (see FIG. 1). The platform 323 is supported by four columns 324 (see FIGS. 1, 2*a* and 2*b*) and has longitudinally extending channels **324*a* (FIG. 1) through which the cartons of cigarettes are moved. The sidewalls of the channels 324*a* both guide and stabilize the cartons of cigarettes as they are moved through the assembly 30. A worm gear mechanism 325** (FIG. 2*a*) is connected to each of the columns 324 to enable the platform 323 to be raised and lowered relative to a base frame **325*a* on which the slide bar assemblies 122 through 126 are mounted. By manually operating the mechanism 325, the height of the platform 323 above the base 325*a* can be varied to enable cartons 56 of various sizes, such as cartons of "regular," "king-size" and "imperial length" cigarettes, to be processed through the assembly 30. Thus, when cartons 56 of "regular" size cigarettes are to be processed, the mechanism 325 is operated to position the platform 323 and the carton opening, transfer applying and carton closing apparatus at a relatively low level. Similarly, when cartons 56 of "king-size" or "imperial length" cigarettes are to be processed, the mechanism 325 is operated to position the platform 323** at an appropriately higher level.

INVERTER APPARATUS

On the next succeeding stroke or reciprocation of the slide bar assemblies 122 through 126 the group of cartons are advanced from the closing station 46 to the inverter station 48 by the rearwardmost drive dogs on the slide bar assemblies, that is the drive dogs 148, **148*a* and 148*b*. An inverter assembly 326 at the station 48 then rotates the cartons 180 degrees to rest the cartons on the recently sealed flaps 300 and 306 to press the flaps together. The inverter assembly 326 (FIGS. 18 and 19) includes a plurality of rotatable longitudinally extending rectangular sleeves or open ended boxes 328, 330 and 332 which receive the cartons as they are moved from the carton closing station 46 to the inverter station 48** by the slide bar assemblies.

The inverter boxes 32 through 332 are substantially identical in structure and include a generally funnel shaped mouth section 334 through which the cartons are inserted into the inverter boxes. A pair of pivotally mounted panels 336 and 338 in each of the inverter boxes engage upper and lower surfaces of the cartons to press the flaps of the cartons together and to retain the cartons within the inverter boxes. The pivotally mounted panels 336 and 338 are spaced far enough apart to accommodate relatively large cartons of "imperial length" cigarettes. Of course, springs pivot the panels toward each other to engage the smaller cartons of "regular" and "kingsize" cigarettes when they are being processed in the assembly 30.

The inverter boxes 328 through 332 are mounted on intermeshing spur gears 342, 344 and 346 which are rotatable relative to each other to rotate the inverter boxes 328 through 332 and invert the cartons of cigarettes within the boxes from a first position with the closure flaps of the cartons on an upper side of the cartons to a second or inverted position with the closure flaps on a lower side of the cartons. When the cartons are in the second position the weight of the cartons presses the freshly glued flaps into engagement with each other to insure a secure bond between the wide flaps 306 and the adhesive coatings on the relatively narrow inner flaps 300. The gears 342 through 346 each have an annular track or groove 350 (see FIG. 19) which is engaged by a plurality of guide wheels or rollers 352 to guide the gears 342 through 346 as they are rotated to invert the cartons of cigarettes.

As is perhaps best seen in FIGS. 18 and 20, a drive assembly 356 is mounted within the inverter assembly 326 for rotating the gears 342 through 346 and the associated inverter boxes 328 through 332. The drive assembly 356 includes a pneumatic drive cylinder 358 which is connected to a cylinder 360 to dampen the movements of the drive cylinder 358 and thereby keep shock loadings on the drive assembly 356 to a minimum. The drive cylinder 358 is connected to a transversely extending rack 362 which engages a gear drive train 364 to rotate the gear 346. A guide roller 365 engages the upper side of the rack 362. Of course, rotation of the gear 346 rotates the adjacent intermeshing gears 342 and 344 to contemporaneously rotate the inverter boxes 328 through 332. The stroke of the drive cylinder 358 and the gear ratio of the drive train 364 is such that the gear 346 is rotated through 180 degrees on each inward and each outward stroke of the drive cylinder 358 to invert the carton of cigarettes within the inverter box 332. Thus, the closure flaps on the carton are changed in orientation from the top or upper side of the carton to the bottom or lower side of the carton so that the carton rests against the freshly glued closure flaps to hold the closure flaps in engagement with each other. Of course, when the gear 346 is rotated through one-half of a revolution, the gears 342 and 344 are also rotated through half a revolution to invert the cartons within the inverter boxes 328 and 330 and press the closure flaps of these cartons together.

SHIFTER APPARATUS

The closed cartons of stamped packages of cigarettes are eventually repacked in shipping containers and transported to merchants who sell the packages of cigarettes to the general public. In order to facilitate repacking the cartons of stamped cigarette packages in shipping containers, two groups of cartons are accumulated at the shifter station 50. A group of cartons is ejected from the inverter apparatus 326 and moved into a shifter or accumulator apparatus 370 by movement of a next succeeding or second group of cartons into the inverter apparatus by the slide bar assemblies 122 through 126. As a group of cartons is moved into the shifter or accumulator apparatus 370 they drop downwardly from the inverter boxes into engagement with a longitudinally extending support panel 372 (see FIG. 21). The cartons 56 are pressed downwardly against the support panel 372 by retaining or brake cylinders 374, 376 and 378 which are best seen in FIGS. 22 and 23. The brake cylinders include piston rods having heads 382 which are moved from a retracted position shown in dashed lines in FIG. 21 to an extended position shown in solid lines in FIG. 21 by operation of the brake cylinders 374 through 378 immediately after a group of cartons begins to emerge from the inverter assembly 326. The brake cylinders press the cartons downwardly and resist movement of the cartons through the shifter apparatus 370. A flexible flap 386 is provided at the forwardmost end of the shifter apparatus 370 to align the cartons in the shifter apparatus 370. Of course, the aligner flap 386 is sufficiently flexible to enable the cartons to be moved out of the shifter apparatus when positively engaged by a suitable conveyor.

The next subsequent or second group of cartons is interspersed or interleaved with the first group of cartons to accumulate a column or row of six cartons in the shifter apparatus 370. To this end the shifter apparatus 370 includes an outwardly projecting overhanging housing 390 having a plurality of transversely extending support bars or shafts 392 (see FIG. 22) upon which a carriage 394 is mounted for reciprocating movement by a drive cylinder 396. The housing 390 also supports the brake cylinders 374, 376, and 378. As is perhaps best seen in FIG. 23, a plurality of shifter plates 400 through 408 extend downwardly from the carriage 394 and are spaced apart relative to each other the same transverse distance by which the cartons 56 of a group of cartons are spaced apart. The shifter plates 400, 402, 404, 406 and 408 are shown in FIG. 23 in a position to engage and move the first group of cartons to the left as viewed in FIG. 23 when the carriage 394 is moved to the left by the drive cylinder 396. This leftward movement of the cartons 56 moves them out of alignment with the inverter boxes 328 through 332 (see FIG. 18) so that the second or succeeding group of cartons can be interspersed or interleaved with the first group of cartons to provide a transversely extending row or column of six cartons. The accumulation of a single row of six cartons facilitates placing the cartons in a conventional shipping container since the shipping container is sized to receive sixty cartons of cigarettes in ten rows or columns of six each.

After the first two groups of cartons have been removed from the shifter apparatus 370, by means not shown, a next succeeding or third group of cartons is moved into the shifter apparatus 370. The carriage 394 is then moved to the right, as viewed in FIG. 23, to move the third group of cartons to the right and out of alignment with the inverter boxes 328 through 332 of the inverter apparatus 326. A fourth group of cartons can then be interspersed or interleaved with the third group of cartons. Thus, the carriage 394 is alternately reciprocated from left to right and from right to left to shift every other or every second group of cartons relative to the conveyor lines to enable a next succeeding group of cartons to be interspersed or interleaved with the preceding group of cartons to form a single row or column of two groups or six cartons.

It is contemplated that the column of six cartons will be removed from the shifter apparatus 370 and transported by a suitable conveyor to a packing mechanism similar to the packing mechanism shown in the aforementioned application Ser. No. 666,521, filed on Sept. 8, 1967. However, the assembly 30 can be associated with any desired packing mechanism. In fact, if desired, the column of six cartons can be manually removed from the shifter apparatus 370 and placed in a shipping container.

CONTROL APPARATUS

Electrical control apparatus for the assembly 30 is shown in FIG. 24. The electrical control apparatus of FIG. 24 is associated with pneumatic control and drive apparatus which is shown schematically in FIG. 25.

The electrical control apparatus can be considered, for purposes of clarity of description, as being made up of two interconnected circuits, that is a condition detecting circuit 414 and an apparatus control circuit 416. The electrical circuits 414 and 416 are connected to a source of power by a pair of lines 418 and 420 when a pair of normally open power switches 422 and 424 are closed. When the power lines 418 and 420 are energized by the closing of the switches 422 and 424, an indicator light 426 on a control panel 428 (see FIG. 2*a*) is energized to indicate to an operator of the assembly 30 that the circuits 414 and 416 are energized. Closing the switches 422 and 424 also energizes a motor 430 for the in feed conveyor 32. Energization of the motor 430 operates the conveyor 32 to supply cartons or receptacles to the loading station 34 in the manner previously explained.

When a group of cartons, that is three cartons in the example given, have been accumulated at the loading station 34, the normally open carton group sensor switch 62 (see FIG. 3) is actuated by moving the plunger 64 relative to the switch. Closing the sensor switch 62 connects a clamp close solenoid 436 to the power lines 418 and 420 through normally open contacts 442 of the switch 62. Energization of the clamp close solenoid 436 operates pneumatic control apparatus to conduct air under pressure to the clamp cylinder 72 of FIG. 4 to move the clamp assembly 66 into engagement with a carton of cigarettes next adjacent to the group of cartons on the loading platform. Closing of the carton group sensor switch 62 also connects power through the normally open contacts 444 of the switch 62 to the normally open flap detector switches 178 (see FIGS. 8 and 8*a*). Assuming that a group of properly opened cartons are positioned at the carton opening station 38 in engagement with the switch actuators 180 and 182 (see FIGS. 7, 8 and 8*a*), the flap detector switches 178 are operated from a normal position shown in FIG. 24 to an actuated position to conduct electrical energy to a normally open paper detect switch 448 (see FIG. 9). It should be noted, that if a group of properly opened cartons is not positioned at the opening station 38 to close the flap detector switches 178, one of the indicator lamps 184 is energized by electrical energy conducted from the power line 418 to the indicator lamp over a circuit including the contacts 444 of the now closed carton detect switch 62 and the switch 178 associated with an unopened carton. The circuit for energizing the indicator lamps is completed to the power line 420 by a lead 450.

The normally open paper detect switch 448 is mounted in the housing 202 of the transfer applicator assembly 200 (see FIG. 9) and is closed by engagement with the transfer supply sheet 42 when the transfer supply sheet 42 extends from the roll 206 and over the cartons containing the packages of cigarettes.

Continuing with reference to FIG. 24, a normally open automatic operation switch 451 is mounted on the control panel 428 (FIG. 2*a*) and is connected in series with the paper detect switch 448. During automatic operation of the assembly 30, the automatic operation switch 451 is closed by the operator. The automatic operation switch is connected by a lead 452 to a slide bar out solenoid 454 which is in turn connected to pneumatic apparatus for controlling the operation of the piston and cylinder assemblies 136 (see FIG. 6) and the reciprocating movement of the slide bar assemblies 122, 124 and 126. Energization of the slide bar out solenoid 454 operates the pneumatic control apparatus to move the slide bar assemblies 122 through 126 forwardly from their initial or home positions to advance the groups of cartons along the assembly 30. The circuit for energizing the slide bar out solenoid 454 is completed to the power line 420 through a lead 456 and a plurality of normally open slide bar home or position sensing switches 458 which are mounted adjacent to the slide bar assemblies 122 through 126 (see FIG. 6). The switches 458 are closed by cam surfaces 462 on the connector blocks 138 (FIG. 6) when the slide bar assemblies 122 through 126 are in the initial or home position.

Assuming that the slide bar assemblies 122 through 126 are in the initial or home position, that the flap detector switches 178 are actuated by the flaps of properly opened cartons and that the paper detect switch 448 is closed by a transfer supply sheet 42, the slide bar out solenoid 454 is energized to actuate the piston and cylinder assemblies 136 and move the slide bar assemblies 122, 124 and 126 forwardly from their initial positions to their loading positions. This movement advances the groups of cartons in the assembly 30 forwardly and enables other cartons to be moved onto the loading platform 58 by the conveyor 32. It should also be noted that a platen up and supply sheet index solenoid 466 was previously energized through a circuit including the slide bar home switches 458 to actuate pneumatic control apparatus to conduct air under pressure to the cylinders 234 and 236 of the transfer applicator assembly 200 (see FIGS. 9 and 11). The cylinders 234 and 236 will have lifted the stamp platens 216, 218 and 220 upwardly to enable the group of cartons to which transfers have just been applied to be moved from the transfer application station 40 to the adhesive application station 44. In addition, pneumatic control apparatus is actuated by the solenoid 466 to conduct air under pressure to the supply sheet drive cylinder 212 (see FIG. 9) to operate the ratchet mechanism 210 and advance or index the transfer supply sheet 42 relative to the platen. This movement of the transfer supply sheet 42 positions transfers beneath the platens for application to cigarette packages in the next group of cartons.

As the slide bar assemblies 122 through 126 are moved away from the home position, the slide bar home or position sensing switches 458 are released for movement to their normal open positions to interrupt the circuit for energizing the slide bar out solenoid 454 and platen up and supply sheet index solenoid 466. However, the outward movement of the slide bar assemblies continues until the end of the forward strokes of the piston and cylinder assemblies 136 (see FIG. 6) since the energization of the slide bar out solenoid 454 has operated a control valve to an open position and the control valve remains in the open position until positively operated to a closed positin. When the slide bar assemblies 122 through 126 have been moved forward for a complete stroke, cam surfaces 470 (see FIG. 6) on the connector members 138 actuate a plurality of slide bar out switches 472 (see FIG. 6) which are associated with the slide bar assemblies 122 through 126.

Actuation of the normally open slide bar out switches 472 energizes a plurality of solenoids in the apparatus control circuit 416. A clamp open solenoid 476 is energized to operate pneumatic control apparatus to exhaust the clamp cylinder 72 of FIG. 4 to the atmosphere. The clamp assembly 66 then moves outwardly, under the influence of a return spring within the cylinder 72, to the open position in which cartons can be moved by the conveyor 32 to the loading station 34. In addition, closing the slide bar out switches 472 completes a circuit for energizing a slide bar return solenoid 478. Energization of the slide bar return solenoid 478 operates pneumatic apparatus to conduct air under pressure to the right end, as viewed in FIG. 6, of the piston and cylinder assemblies 136 to move the slide bar assemblies 122 through 126 rearward to the home or initial position.

The closing of the slide bar out switches 472 completes circuitry to energize solenoids to operate the apparatus at the transfer application stations 40, the inverter station 48 and the shifter station 50. A platen down and supply sheet return solenoid 480 is energized when a group of cartons is located at the transfer application station 40 to close the normally open carton detect switches 482 (see FIGS. 2*a* and 24). Energization of the solenoid 480 actuates pneumatic control apparatus to conduct air under pressure to an upper end portion of the cylinders 234 and 236 of the transfer application assembly 200 (see FIGS. 9 and 11) to move the platens 216, 218 and 220 downwardly to contemporaneously apply transfers to packages of cigarettes in a group of three cartons. Energization of the platen down and supply sheet return solenoid 480 also conducts air to the right hand end (as viewed in FIG. 9) of the drive cylinder 212 to index the ratchet mechanism 210 for the next stroke.

The inverter drive cylinder 358 (see FIG. 18) is alternately connected at opposite ends to air under pressure to reciprocate the rack 362 and move the inverter boxes 328, 330 and 332 through 180 degrees of rotation. In order to provide the alternate left and right movement of the rack 362, an inverter switch 484 (see FIG. 18) is actuated on each outward stroke of the drive cylinder 358 by the rack 362 as indicated in dashed lines at 485 in FIG. 18. When the switch 484 is in its normal or unactuated position (shown in FIG. 24), an inverter right solenoid 486 is energized to operate pneumatic control apparatus and conduct air under pressure to a left hand end of the drive cylinder 358 (see FIG. 18) to move the rack 362 toward the right as viewed in FIG. 18. When the rack gear is moved toward the right and the inverter boxes 328 through 332 have been rotated for 180 degrees in a first direction, the switch 484 is actuated by the rack 362. An inverter left solenoid 488 is then energized when the slide bar out switches 472 are again closed on the next reciprocation of the slide bar assemblies 122 through 126. Energization of the inverter left solenoid 488 operates pneumatic control apparatus to conduct air under pressure to a right hand end of the drive cylinder 358 to move the rack 362 toward the left and rotate the inverter boxes 328 through 332 in the opposite direction. Thus, the inverter boxes 328 through 332 are alternately rotated for 180 degrees in a clockwise direction and then rotated for 180 degrees in a counterclockwise direction on repeated reciprocation of the slide bar assemblies 122 through 126 to invert groups of cartons within the inverter boxes 328 through 332 in the manner previously explained.

The carriage 394 of the shifter or accumulator assembly 370 (see FIG. 22) is alternately shifted to the right or to the left on every second complete reciprocation of the slide bar assemblies 122 through 126 to interleave or intersperse groups of cartons. A shifter control switch 492 (see FIGS. 22 and 24) is actuated by a cam portion 493 on the carriage 394 when the carriage is in a right hand position as viewed from the right in FIG. 22. When the carriage is at the left, the switch 492 is in the normal position shown in FIG. 22 and a shift right solenoid 494 is energized to operate pneumatic control apparatus to conduct air under pressure to a left hand end of the cylinder 396 to move the carriage toward the right. Movement of the carriage toward the right actuates the switch 492 to energize a shift left solenoid 498. Energization of the shift left solenoid 498 conducts air under pressure to the right hand end of the cylinder 396 to move the carriage 394 toward the left.

As was previously mentioned, the carriage 394 is operated to shift every second group of cartons so that the next succeeding group of cartons can be interspersed with the preceding group of cartons to accumulate a row of six aligned cartons in the shifter assembly 370. Accordingly, the switch 492 is connected in series with one of the contacts of the inverter switch 484. The inverter switch 484 is operated by the rack 362 on every other stroke of the drive cylinder 358. Therefore, the switch 492 is connected to the power line 420 through the inverter switch 484 and slide bar out switches 472 on every second cycle of operation of the slide bar assemblies 122 through 126. Consequently, if the carriage 394 is in the right hand position shown in FIG. 22 and the inverter drive cylinder 358 is in the right hand position, indicated in dashed lines at 485 in FIG. 18, the inverter switch 484 and the shifter control switch 292 will be closed on the lowermost contacts and the shift left solenoid 498 energized through a circuit including the shifter switch 492, the inverter switch 484 and the slide bar out switches 472, when the slide bar assemblies 122 through 126 are next moved to the loading position from the initial or home position. Energization of the shift left solenoid 498 operates pneumatic control apparatus to conduct air under pressure to the right hand end of the cylinder 396 (see FIG. 22) to move the carriage 394 to the left. As the carriage 394 is moved to the left, the switch 492 is released and moved to its normal position shown in FIG. 24. Of course, the inverter left solenoid 488 is also energized and the drive cylinder 358 (see FIG. 18) is operated by air conducted to the right hand end of the cylinder to rotate the inverter boxes 428 through 432 and move the rack 362 out of engagement with the switch 484. The switch 484 now assumes the normal position shown in FIG. 24.

The next or second cycle of operation of the slide bar assemblies 122 through 126 interleaves a second group of cartons with the first group of cartons. However, the shifter carriage 394 is not moved to the right since the inverter switch 484 is in its normal position shown in FIG. 24. On a third cycle of operation of the slide bar assemblies 122 through 126, after the first two groups of cartons have been removed from the shifter assembly 370, a third group of cartons is moved into the shifter assembly. When these cartons are moved into the shifter assembly 370 the shift right solenoid 494 is energized since the shifter switch 492 is in its normal or unactuated position (shown in FIG. 24) and the inverter switch 484 is closed by the rack 362. Similarly, the shift left solenoid is not energized again until after a fourth group of cartons has been interspersed with the third group of cartons and removed from the shifter assembly 370.

Pneumatic control circuitry 510 and associated electrical control circuitry are shown schematically in FIG. 25. The pneumatic control circuitry includes a main surge tank 512 which is connected to a source of air under pressure, indicated at 514 in FIG. 25. A main air line 516 is connected to the tank 512 and to a plurality of air manifolds 518, 520 and 522. The manifold 518 is connected by an air line or conduit 526 to a control valve 528 which is actuated by the inverter right and inverter left solenoids 486 and 488 to control the operation of the inverter drive cylinder 358 (see FIGS. 18 and 25) which is connected to the dampener cylinder 360 in the manner previously explained. When the inverter right solenoid 46 is energized, the control valve 528 is actuated to connect one end of the drive cylinder 358 to the manifold 518 through the air line 526 and an air line 532 to thereby rotate the inverter boxes 328, 330 and 332 in a first direction. Similarly, when the inverter left solenoid 488 is energized, the control valve 526 is actuated to connect air under pressure to the opposite end of the drive cylinder 358 through a fluid conduit or air line 534 to rotate the inverter boxes 328, 330 and 332 in an opposite direction. The manifold 518 is also connected by an air line or conduit 538 to a control valve 540 which is operated by the energization of the shift right and shift left solenoids 494 and 498. The control valve 540 is connected to the shift cylinder 396 (FIG. 22) by fluid conduits or air lines 542 and 544 to shift the carriage 394 to either the right or the left in the manner previously explained.

The manifold 520 is connected by an air line or conduit 548 to a manually operated pressure release valve 550 and to a control valve 552 by an air line or conduit 554. The control valve 552 is operated by energization of the slide bar out solenoid 454 and the slide bar return solenoid 478 to selectively actuate pilot valves 556 and 558. The pilot valves 556 and 558 are connected directly to the main air line or conduit 516 by air lines or conduits 560 and 562. The pilot valve 556 is connected to the rearward ends of the piston and cylinder assemblies 136 for the slide bar assemblies 122, 124 and 126. To avoid confusion, the suffix letter *a* has been added to the numeral 136 designating the piston and cylinder assembly for the slide bar assembly 124 while the suffix letter *b* has been added to the numeral designating the piston and cylinder assembly associated with the slide bar assembly 126.

The pilot valve 558 is connected to the forward ends of the piston and cylinder assemblies 136, **136*a* and 136*b*. When the slide bar out solenoid 454 is energized, the control valve 552 is operated to actuate the pilot valve 556 and connect the piston and cylinder assemblies 136, 136*a* and 136*b* to the air line 560 through a plurality of conduits 566, 568 and 570 to move the slide bar assemblies 122 through 126 forwardly from the home or initial position. Similarly, when the slide bar return solenoid 478 is energized, the control valve 552 is operated to close the pilot valve 556 and open the pilot valve 558 to connect air lines or conduits 572, 574 and 576 to the main air line 516. Air under pressure is then conducted through the conduits 572 through 576 to operate the piston and cylinder assemblies 136, 136*a* and 136*b* to move the slide bar assemblies 122 through 126 rearwardly to the initial or home position from the loading position. The pilot valves 556 and 558 are used to control the flow of air to the piston and cylinder assemblies 136, 136*a* and 136*b* rather than connecting the piston and cylinder assemblies directly to the control valve 552** because the control valve restricts the flow of air and is unable to supply air to the piston and cylinder assemblies at a high enough flow rate.

The manual pressure release valve 550 is provided to permit manipulation of the slide bar assemblies in the event of a malfunction of the assembly 30 and a jam up of cartons. The valve 550 is connected to the fluid conduits 548 and 554 and the control valve 552 to exhaust the control valve 552 and thereby open both of the pilot valves 556 and 558. This puts air pressure on both ends of the cylinders 136, **136*a*, and 136*b***, and thereafter pressure can be released slowly from either end of the cylinders to effect the desired movement of the slide bar assemblies in order to correct the malfunction.

The control valve 52 is connected by an air line 580 to the drive cylinder 106 at the separator station 36 (see FIG. 5). When the slide bar return solenoid 478 is energized, the drive cylinder 106 is operated by air conducted through the conduit 580 to move the separator arms 98 and 104 (see FIG. 5) outwardly. This outward movement of the arms 98 and 104 separates the cartons forming a group of spaced cartons.

The manifold 520 is connected to a control valve 584 by a conduit or air line 586. The control valve 584 is operated by energization of the platen up and supply sheet index solenoid 466 to connect air to the platen cylinders 234 and 236 (see FIGS. 11 and 25) through an air line or conduit 590 to lift the platens upwardly. In addition, energization of the solenoid 466 conducts air under pressure to the conduit 592 to move the paper drive cylinder 212 and index the ratchet mechanism 210 (see FIGS. 9 and 25). Similarly, energization of the platen down and supply sheet index return solenoid 480 operates the control valve 584 to conduct air under pressure through the conduit 596 to the cylinders 234 and 236 to move the platens downwardly against the transfer supply sheet 42 to apply transfers to a plurality of packages of cigarettes in the manner previously explained. The drive cylinder 212 is returned to the initial position upon energization of the solenoid 480 by air conducted through the conduit 598 to the cylinder 212.

The manifold 520 is also connected by a line 602 to a control valve 600 which is operated by the clamp open solenoid 476 and the clamp close solenoid 436 to control the operation of the clamp cylinder 72 (see FIG. 4) with air conducted under pressure to the cylinder through a conduit 606. When the clamp close solenoid 436 is energized air is conducted through the conduit 606 to move the clamp assembly 66 (see FIG. 4) into engagement with a carton of cigarettes. When the clamp open solenoid 476 is energized, the control valve 600 exhausts the clamp cylinder 72 to the atmosphere and a return spring in the clamp cylinder moves the clamp arms 68 and 70 outwardly to release the previously engaged carton.

The manifold 522 is connected to a plurality of two-way control valves 610, **610*a* and 610*b* by air conduits or lines 612. The control valve 610 is associated with the center slide bar assembly 122 while the control valves 610*a* and 610*b* are associated with the slide bar assemblies 124 and 126, respectively. When the slide bar assembly 122 approaches the initial or home position from the loading position, the control valve 610 is actuated by the cam surface 462 on the connector member 138 (see FIG. 6). Actuation of the control valve 610 connects air under pressure from the control valve 610 to air lines or conduits 614, 616 and 618. The air flows from the conduit 614 to the brake cylinder 376 of the shifter assembly 370 (see FIGS. 22 and 23) to move the piston within the cylinder upwardly and release a carton held in the shifter assembly by the piston. Actuation of the control valve 610 also connects air under pressure to the conduit 616 and the drive cylinder 274 (see FIGS. 15 and 25) which pivots the positioning assembly 265 to a normal or nonblocking position. This operation of the cylinders 376 and 274 enables cartons presently positioned in the inverter apparatus 370 and the transfer applicator assembly 200 to be moved in a forward direction on the next cycle of operation of the slide bar assembly 122. Similarly, actuation of the control valves 610*a* and 610*b* operates the cylinders 378 and 274 and the cylinders 374 and 274, respectively, to release cartons of the two outer conveyor lines for forward movement. Since the operation of the cylinders associated with each of the slide bar assemblies is substantially the same, it is believed that a further explanation is not required at this time. However, it should be noted that the carriage return cylinder 158 (see FIG. 6) is operated by air conducted through the conduit 618 when the control valve 610 is actuated. When the carriage return cylinder 158 is operated, the carriage 160 is moved upwardly to raise the pull bar 78 above the transfer platform 58** to the position shown in dashed lines at the left of FIG. 6.

METHOD OF OPERATION

The operation of the assembly 30 is begun by closing the power switches 422 and 424 (see FIG. 24) to energize the conveyor motor 430. Energization of the motor 430 operates the input or loading conveyor 32 (see FIG. 2*b*) to transport cartons or receptacles to the loading station 34. When a group of cartons, that is three cartons, have accumulated at the loading station 34, the carton group sensor switch 62 is actuated and the clamp assembly 66 (see FIG. 4) is closed to clamp the next succeeding or fourth carton. However, it should be noted that during the starting up of the assembly 30, there are no opened cartons at the carton opening station 38 so that the flap detector switches 178 are in the normal position shown in FIG. 24 and one of the indicator lights 180 is illuminated by electrical energy conducted from the power line 418 through the switch 62 and a switch 178 to the lead 450 and the power line 420. In order to begin the operation of the assembly 30, a normally open manual operation switch 640 is operated to bypass the flap detector switches 178, the paper detect switch 448, and the automatic operation switch 451 to directly energize the slide bar out solenoid 454. Closing the switch 640 energizes the slide bar out solenoid 454 (assuming that the slide bars are in home position and the switches 458 are closed) to actuate the control valve 552 and pilot valve 556 (see FIG. 25) to conduct air under pressure to the cylinder assemblies 136, **136*a* and 136*b* and move a first group of cartons from the loading station 34 to the separator station 36 with the pull bar 78**.

When the slide bar assemblies 122 through 126 reach the loading position, the slide bar out switches 472 (see FIGS. 6 and 22) are closed and the clamp open solenoid 476 is energized to operate the control valve 600 (see FIG. 25) to release the cartons previously held by the clamp assembly 66. It should be noted that the carton detect switches 482 are not closed at this time since there is not a group of cartons at the transfer application station 40 (see FIGS. 2*b* and 24). Therefore, the platens are not pivoted downwardly and the drive cylinder 212 (see FIGS. 9 and 25) is not operated to set the ratchet mechanism 210 to move index the transfer supply sheet 42 from its present position. The inverter right solenoid 486 is energized to rotate the now empty inverter boxes 328 through 332. Of course, the closing of the slide bar out switches 472 also completes a circuit for energizing the slide bar return solenoid 478. Energization of the slide bar return solenoid 478 actuates the control valve 552 to close the pilot valve 556 and open pilot valve 558 (see FIG. 25) to move the slide bar assemblies 122 through 126 rearwardly to the home or initial position while the group of cartons which had just been placed at the separator station are spaced apart by operation of the separator cylinder 106.

A second actuation of the manual operation switch 640, after a second group of cartons has accumulated at the loading station 34, reciprocates the slide bar assemblies 122 through 126 to move the second group of cartons to the separator station 36 while advancing the first group of cartons from the separator station to the carton opening station 38. Again, the transfer applicator platens 216, 218 and 220 will not be lowered since the carton detect switches 482 will remain open. The slide bar assemblies 122 through 126 will then return to the home position. Since the first group of cartons will now have been opened at the station 38 and will hold the flap detector switches 178 closed, the operator may now close the switch 451 to begin automatic operation of the machine. On the third cycle the first group of cartons will be advanced to the transfer application station 40 to close the carton detect switches 482. The solenoid 480 will then be energized to operate the control valve 584 to conduct air to the cylinders 234 and 236 (see FIGS. 11 and 25) to lower the platens 216, 218 and 220 and apply transfers to the packages of cigarettes in the first group of cartons.

In succeeding cycles the slide bar assemblies 122 through 126 will be reciprocated to advance the first group of cartons from the transfer application station 40 to the adhesive application station 44. Adhesive will be applied at the adhesive application station 44 to the relatively narrow flaps 300 of the first group of cartons. The next automatic cycle of operation of the slide bar assemblies 122 through 126 advances the first group of cartons to the closing station 46 where they are closed. The first group of cartons is then advanced progressively to the inverter station 48 and then to the shifter or accumulator station 50 on the next two subsequent operations of the assembly 30. The first group of cartons will reach the shifter station 50 after seven cycles of operation of the assembly 30. On the eighth cycle of operation of the assembly 30, the shifter switch 484 (see FIGS. 18 and 24) will be actuated to energize the inverter left solenoid 488 and the shift right solenoid 494 through the switch 492 so that the first group of cartons is shifted to the right and the second group of cartons can be subsequently interspersed with the first group of cartons. After groups of cartons have been accumulated at the shifter station 50, the cartons will be removed from the shifter station and packed in a shipping container.

The operation of the assembly 30 will then continue in the manner previously explained as long as cartons are placed on the input or loading conveyor 32 and conducted to the loading station 34 to actuate the carton group sensor switch 62. When it is desired to end the operation of the assembly 30 it is merely necessary to stop placing cartons on the input or loading conveyor 32. Naturally, groups of cartons will no longer accumulate at the loading station to actuate the carton detect switch 62 and the slide bar out solenoid will not be energized to reciprocate the slide bars to the loading position from the home position. The cartons which are in the assembly can then be moved through the assembly by actuating the manual operation switch 640 until the last group of cartons is moved to the shifter station 50. It should be noted that after the last group of cartons has moved past the transfer application station 40, the carton detect switches 482 will no longer be closed and the transfer applicator assembly will not be operated and waste transfers.

In view of the preceding remarks, it is believed that the operation of the assembly 30 for opening receptacles or cartons 56 of cigarettes and applying transfers to articles or packages of cigarettes in the receptacles and closing the receptacles will be apparent to those skilled in the art. The assembly 30 automatically applies transfers to the plurality of packages of cigarettes in each carton of a group of cartons by bringing the platens 216, 218 and 220 contemporaneously downward against the transfer supply sheet 42. The cartons can be loaded into the assembly 30 with the flaps positioned upwardly in either one of two orientations, that is the relatively large outer flap 306 can extend transversely toward either the left or the right. This ability to accept cartons with the flaps in any one of the plurality of positions results from the use of carton opening members 174 which can open the cartons with the relatively large outer flap 306 extending either to the left or to the right and from the use of adhesive applicator assemblies 282 through 288 which apply adhesive to only the relatively narrow flap 300 whether the flap 300 is on the left or the right. The inverter assembly 326 rotates the cartons to rest them on the flaps after the adhesive has been applied to the flaps to insure a secured bond or interconnection between the flaps when the adhesive sets or dries. The closed group of cartons is the nmoved to a shifter station 50 where the cartons are moved transversely relative to the longitudinally extending path of movement through the assembly 30. When a second group of cartons has been interspersed with a first group of cartons to accumulate six cartons, the six cartons are withdrawn from the shifter assembly and placed in a standard shipping container which is sized to receive cartons in rows or columns of six.

Although the assembly 30 has been shown in connection with apparatus for applying transfers to packages of cigarettes, it is contemplated that the assembly 30 will be used by those skilled in the art in many other environments wherein it is desirable to apply transfers to a plurality of articles within a plurality of receptacles. It is also contemplated that the particular apparatus used at the work stations 34 through 50 will be varied by those skilled in the art to suit the particular use to which the assembly is placed. It should be noted that while it has been found to be particularly advantageous to use groups of three receptacles or cartons with a conventional transfer supply sheet 42 having fifteen longitudinally extending rows of transfers, either larger or smaller groups of cartons could, if desired, be used. It is also contemplated that those skilled in the art may find it desirable to use a single large platen for applying transfers rather than three separate platens as shown in connection with the transfer applying apparatus 200. Furthermore, although the invention is concerned particularly with the application of transfers to articles such as cigarette packages and although the illustrated specific embodiment pertains to a transfer application system, it will be recognized that many features of the invention and various combinations thereof can be used advantageously in a system in which printed indicia or the like are applied to the packages rather than transfers.

Therefore, while a particular embodiment of the invention has been shown, it should be understood, of course, that the invention is not limited thereto since many modifications may be made within the scope of the appended claims.

What is claimed is:

1. Apparatus comprising means for receiving and grouping a plurality of receptacles each of which contains a plurality of articles, conveyor means for transporting said plurality of receptacles. opener means mounted adjacent to said conveyor means for contemporaneously opening said plurality of receptacles to expose said articles, and indicia applicator means mounted adjacent to said conveyor means for contemporaneously applying indicia to said articles within said plurality of receptacles.

2. Apparatus as set forth in claim 1 wherein said indicia applicator means comprises transfer applicator means including means for positioning a transfer supply sheet relative to said plurality of receptacles and a plurality of platens which are mounted for contemporaneous movement into engagement with said transfer supply sheet to contemporaneously apply transfers to said articles within said plurality of receptacles.

3. Apparatus as set forth in claim 2 wherein said transfers are arranged in a plurality of rows on said transfer supply sheet and each of said platens includes a plurality of spaced apart operating sections, each of said operating sections being associated with one of said rows of transfers for applying transfers from the associated row.

4. Apparatus as set forth in claim 3 further including positioning means mounted adjacent said transfer applicator means and cooperable with said plurality of receptacles for positioning the same in predetermined relation with each other and with said transfer sheet and said operating sections whereby to enable transfers to be applied at predetermined locations on said articles.

5. Apparatus as set forth in claim 4 further characterized in that said positioning means is cooperable with said plurality of receptacles for positioning the same in an offset relationship with each other to enable transfers to be applied to central portions of said articles.

6. Apparatus as set forth in claim 1 wherein said opener means and said indicia applicator means are adjustable relative to said conveyor means to enable receptacles of different sizes to be opened by said opener means and to enable indicia to be applied to articles of different sizes in receptacles of different sizes by said indicia applicator means.

7. Apparatus comprising grouping means for segregating groups of receptacles each of which contains a plurality of articles, opener means for opening groups of receptacles to expose the articles within the receptacles, indicia applicator means for applying indicia to the articles within each receptacle of a group of opened receptacles, conveyor means for moving groups of receptacles relative to said aforementioned means, and control means responsive to the segregating of a first group of receptacles by said grouping means and the opening of a second group of receptacles by said opener means to operate said conveyor means to move said first group of receptacles from said grouping means to said opener means and to move said second group of receptacles from said opener means to said indicia applicator means to thereby position said second group of receptacles to enable indicia to be applied by said indicia applicator means to the articles in said second group of receptacles.

8. Apparatus as set forth in claim 7 further characterized in that said control means is also responsive to the positioning of a group of receptacles at said indicia applicator means to enable said indicia applicator means to be operated only when a group of opened receptacles is located at said indicia applicator means.

9. Apparatus as set forth in claim 1 further including closure means mounted adjacent to said conveyor means for contemporaneously closing said plurality of receptacles after said indicia have been applied to said articles within said plurality of receptacles.

10. Apparatus as set forth in claim 1 further including adhesive applicator means mounted adjacent to said conveyor means for contemporaneously applying an adhesive to at least one of a plurality of flaps on each receptacle, and closure means mounted adjacent to said adhesive applicator means for contemporaneously closing the flaps of said receptacles after the adhesive has been applied.

11. Apparatus as set forth in claim 10 further including a unitary support for said opener means, said indicia applicator means, said adhesive applicator means, and said closure means, and adjustment mechanism connected to said support for positioning the same in predetermined spaced relationship with said conveyor means to enable said apparatus to accommodate receptacles of different sizes.

12. Apparatus as set forth in claim 11 wherein said support includes means providing a plurality of guide channels through which said receptacles are moved by said conveyor means.

13. Apparatus as set forth in claim 10 further including inverter means mounted adjacent to said closure means for contemporaneously inverting said plurality of receptacles from a position in which the flaps are uppermost to a position in which the flaps are lowermost whereby the weight of the receptacles and the articles therein holds the adhesively connected flaps in closed position against an underlying support surface.

14. Apparatus as set forth in claim 9 further including accumulator means mounted adjacent to said closure means and comprising means for shifting a first plurality of closed receptacles relative to said conveyor means while maintaining a spaced apart relationship therebetween and means for interspersing a second plurality of closed receptacles with said first plurality of receptacles to thereby facilitate packing said first and second plurality of receptacles into a container.

15. Apparatus as set forth in claim 1 further including adhesive applicator means mounted adjacent to said conveyor means for contemporaneously applying an adhesive to at least one of a plurality of flaps on each receptacle, closure means mounted adjacent to said adhesive applicator means for contemporaneously closing the flaps of said receptacles after the adhesive has been applied, and accumulator means mounted adjacent to said closure means and comprising means for shifting a first plurality of said receptacles relative to said conveyor means while maintaining a spaced apart relationship therebetween and means for interspersing a second plurality of receptacles with said first plurality of receptacles to thereby facilitate packing said first and second plurality of receptacles into a container.

16. Apparatus as set forth in claim 15 further including inverter means mounted between said closure means and said accumulator means for contemporaneously inverting said plurality of receptacles from a position in which the flaps are uppermost to a position in which the flaps are lowermost whereby the weight of the receptacles and the articles therein holds the flaps in closed position.

17. Apparatus comprising means for receiving and grouping a plurality of receptacles each of which contains a plurality of articles, conveyor means for transporting said plurality of receptacles, transfer applicator means mounted adjacent to said conveyor means for applying transfers to said articles within said plurality of receptacles, and accumulator means mounted adjacent to said conveyor means and comprising means for shifting a first plurality of said receptacles relative to said conveyor means while maintaining a spaced apart relationship therebetween and means for interspersing a second plurality of receptacles with said first plurality of receptacles to thereby facilitate packing said first and second plurality of receptacles into a container.

18. Apparatus comprising means for receiving and forming a group of receptacles each of which contains a plurality of articles, conveyor means for transporting said group of receptacles, separator means mounted adjacent to said conveyor means for spacing apart the receptacles in said group of receptacles, and opener means mounted adjacent to said conveyor means for contemporaneously opening the spaced receptacles of said group of receptacles to expose said articles.

19. Apparatus as set forth in claim 1 further including separator means mounted adjacent to said conveyor means in advance of said opener means for spacing said plurality of receptacles predetermined transverse distances apart to enable said opener means to contemporaneously open said plurality of receptacles by pivoting flaps on each of said receptacles transversely outwardly relative to said receptacles.

20. Apparatus comprising separator means for spacing apart receptacles of a predetermined group of receptacles, receptacle opening means mounted adjacent to said separator means for contemporaneously opening adhered closure flaps of each receptacle of said group of receptacles to expose a plurality of articles within each receptacle, transfer applicator means mounted adjacent to said receptacle opening means for contemporaneously applying transfers to said articles within said group of receptacles, and closure means mounted adjacent to said transfer applicator means for contemporaneously closing said group of receptacles after transfers have been applied to said articles.

21. Apparatus as set forth in claim 20 further including conveyor means for transporting the receptacles, said conveyor means including drive means for engaging said group of the receptacles at a receiving station and moving said group of receptacles to said separator means.

22. Apparatus as set forth in claim 20 wherein said separator means includes first and second side sections located on opposite sides of and spaced outwardly from an intermediate section and spreader means for engaging selected receptacles of said group of receptacles when said group of receptacles is located at said intermediate section and moving said selected receptacles outwardly to said first and second side sections to separate the receptacles of said group of receptacles.

23. Apparatus as set forth in claim 22 wherein said intermediate section has a medial portion which is offset relative to a pair of adjacent side portions, and said spreader means is engageable with receptacles on said adjacent side portions for moving the latter to the side sections of said separator means.

24. Apparatus as set forth in claim 23 wherein said medial portion of said intermediate section is offset in an upward direction relative to said adjacent side portions.

25. Apparatus as set forth in claim 20 wherein said receptacle opening means includes elongated opener members having tapered end portions adapted to be inserted beneath closure flaps on receptacles of said group of receptacles to open said receptacles, said opener members being pivotally mounted for upward swinging movement to permit access to receptacles of said receptacle opening means in the event of improper operation.

26. Apparatus as set forth in claim 20 wherein said transfer applicator means includes means for positioning a transfer supply sheet relative to said group of receptacles, said transfers being arranged in a plurality of rows on said sheet, and a plurality of operating sections, each of said operating sections being associated with a row of transfers on said sheet, and said operating sections being contemporaneously movable to press against the respective associated rows of transfers to contemporaneously apply transfers to said articles within said group of receptacles.

27. Apparatus as set forth in claim 20 wherein said closure means includes adhesive applicator means for contemporaneously applying adhesive to closure flaps of said receptacles.

28. Apparatus as set forth in claim 27 wherein said closure means also includes selector means for selecting predetermined closure flaps from a plurality of closure flaps on said receptacles, and said adhesive applicator means is adapted to apply adhesive to said predetermined closure flaps.

29. Apparatus as set forth in claim 27 further including inverter means mounted adjacent to said closure means for contemporaneously inverting each receptacle of said group of receptacles and positioning the closure flaps of each receptacle in a lowermost position such that the weight of the receptacles and the articles therein holds the adhesively connected flaps in closed position against an underlying support surface.

30. Apparatus as set forth in claim 20 further including accumulator means mounted adjacent to said closure means and comprising means for contemporaneously shifting a first group of closed receptacles while maintaining a spaced apart relationship therebetween and means for interspersing a second group of closed receptacles with said first group of receptacles to facilitate packing both groups of receptacles into a container at the same time.

31. Apparatus as set forth in claim 27 further including accumulator means mounted adjacent to said closure means and comprising means for contemporaneously shifting a first group of closed receptacles while maintaining a spaced apart relationship therebetween and means for interspersing a second group of closed receptacles with said first group of receptacles to facilitate packing both groups of receptacles into a container at the same time.

32. Apparatus as set forth in claim 31 further including inverter means mounted between said closure means and said accumulator means for contemporaneously inverting each receptacle of said group of receptacles and positioning the closure flaps of each receptacle in a lowermost position such that the weight of the receptacles and the articles therein holds the adhesively connected flaps in closed position against an underlying support surface.

33. Apparatus for use in opening and reclosing a receptacle having a pair of closure flaps, said apparatus comprising an opener member for opening a closed receptacle in any one of a plurality of positions by separating adhered flaps of the closed receptacle, adhesive applicator means associated with said opener member for applying adhesive to at least one flap of an open receptacle, and guide means located adjacent to said adhesive applicator means for enabling only a predetermined one of the flaps on an open receptacle to engage said adhesive applicator means when the open receptacle is in any one of said plurality of positions.

34. Apparatus as set forth in claim 33 wherein said adhesive applicator means includes a first applicator member for applying adhesive to the predetermined flap of a receptacle when the receptacle is in a first position and a second applicator member for applying adhesive to the predetermined flap of the receptacle when the receptacle is in a second position.

35. Apparatus as set forth in claim 34 wherein said guide means includes a first guide surface for holding the flap opposite the predetermined flap out of engagement with said first applicator member when the receptacle is in the second position and a second guide surface for holding the flap opposite the predetermined flap out of engagement with said second applicator member when the receptacle is in the first position.

36. Apparatus as set forth in claim 33 further including closure means mounted adjacent to said adhesive applicator means for closing the open receptacle in any one of said plurality of positions by moving the flaps into adhesive engagement, and inverter means mounted adjacent to said closure means for inverting the receptacle so that the weight of the receptacle presses downwardly on the flaps to press the flaps together and adhesively secure the same.

37. Apparatus for applying adhesive to a predetermined flap of a receptacle having a pair of closure flaps, said apparatus comprising a conveyor, a first applicator member mounted on a first side of said conveyor for applying adhesive to said predetermined flap when said receptacle is in a first position relative to said conveyor, a second applicator member mounted on a second side of said conveyor for applying adhesive to said predetermined flap when said receptacle is in a second position relative to said conveyor, a first guide surface located adjacent to said first applicator member for holding the other flap of said receptacle out of engagement with said first applicator member when said receptacle is in said second position, and a second guide surface located adjacent to said second applicator member for holding said other flap of said receptacle out of engagement with said second applicator member when said receptacle is in said first position.

38. Apparatus as set forth in claim 37 further including closure means mounted adjacent to said conveyor for pivoting said predetermined flap to a closed position and for pivoting said other flap to a closed position overlapping said predetermined flap to close said receptacle.

39. Apparatus as set forth in claim 38 further including inverter means mounted adjacent to said closure means for inverting the receptacle so that the weight of the receptacle presses downwardly on the flaps to press the flaps together and adhesively secure the same.

40. Apparatus comprising longitudinally extending conveyor means for transporting a plurality of receptacles, opener means mounted adjacent to said conveyor means for contemporaneously opening said receptacles by separating a pair of adhered closure flaps on each of said receptacles with said flaps in any one of a plurality of positions relative to said opener means to expose a plurality of articles within each receptacle of said plurality of receptacles, transfer applicator means mounted adjacent to said conveyor means for contemporaneously applying transfers to said articles within each open receptacle of said plurality of receptacles, and adhesive applicator means mounted adjacent to said conveyor means for contemporaneously applying adhesive to a predetermined flap on each open receptacle while said flaps are in any one of said plurality of positions to facilitate closing said receptacles after the application of said transfers to said articles in said receptacles.

41. Apparatus as set forth in claim 40 further including a support, said opener means, said transfer applicator means, and said adhesive applicator means being mounted on said support, and adjustment mechanism connected to said support for raising and lowering said support relative to said conveyor means to enable said apparatus to accommodate receptacles of different sizes.

42. Apparatus as set forth in claim 40 further including closure means mounted adjacent to said conveyor means for moving said predetermined flap to a closed position and for moving the other of said flaps to a closed position overlapping said predetermined flap to close said receptacle.

43. Apparatus as set forth in claim 40 further including closure means mounted adjacent to said conveyor means for contemporaneously closing said plurality of receptacles while said flaps are in any one of said plurality of positions by moving the flaps of each receptacle into engagement, and inverter means mounted adjacent to said conveyor means for contemporaneously inverting the closed receptacles so that the weight of each receptacle presses downwardly on its flaps to press the flaps together and adhesively secure the same.

44. Apparatus as set forth in claim 43 wherein said adhesive applicator means includes a first plurality of applicator members for contemporaneously applying adhesive to said predetermined flaps of receptacles which are in a first position relative to said conveyor means, a second plurality of applicator members for contemporaneously applying adhesive to said predetermined flaps of receptacles which are in a second position relative to said conveyor means, a first plurality of guide surfaces each of which is located adjacent to an associated applicator member of said first plurality of applicator members for holding the other flaps of receptacles in said second position out of engagement with the associated applicator members of said first plurality of applicator members, and a second plurality of guide surfaces each of which is located adjacent to an associated applicator member of said second plurality of applicator members for holding the other flaps of receptacles in said first position out of engagement with the associated applicator members of said second plurality of applicator members.

45. A method comprising the steps of opening a plurality of a receptacles each of which contains plurality of articles to expose said articles, positioning the plurality of open receptacles in predetermined relation with an overlying transfer supply sheet, and contemporaneously applying transfers from said transfer supply sheet to said articles in said plurality of receptacles.

46. A method as set forth in claim 45 further characterized in that said transfers are arranged in a plurality of rows on said transfer supply sheet, said receptacles are positioned in offset relation to each other, and transfers from immediately adjacent rows on said sheet are applied to articles in different receptacles.

47. A method as set forth in claim 46 wherein the transfers are applied to a predetermined portion of each of the articles corresponding to the relative positioning of said receptacles.

48. A method as set forth in claim 46 further characterized in that said receptacles are opened substantially at the same time and are closed substantially at the same time after transfers are applied to said articles.

49. A method as set forth in claim 45 further including the steps of applying adhesive to open closure flaps on the receptacles after said transfers have been applied to said articles, closing said flaps, and inverting said receptacles to hold said closure flaps in engagement with each other after the adhesive has been applied to said closure flaps.

50. A method as set forth in claim 45 further including the steps of closing the receptacles after the application of transfers to the articles therein, and interspersing one group of closed receptacles with another group of closed receptacles to facilitate placing both groups of receptacles in a container.

51. A method as set forth in claim 49 further including the step of interspersing one group of closed receptacles with another group of closed reecptacles to facilitate placing both groups of receptacles in a container.

52. A method comprising the steps of assembling a group of contiguous receptacles each having closure flaps and each containing a plurality of articles, moving said group to a separating station and there spreading apart the receptacles of said group sufficiently to permit the flaps to be opened outwardly without interference between the flaps of adjacent receptacles, and thereafter opening the flaps of said receptacles to expose the articles therein.

53. A method as set forth in claim 52 including the further steps of positioning the plurality of open receptacles in predetermined relation with an overlying transfer supply sheet, and contemporaneously applying transfers from said supply sheet to said articles in said receptacles.

54. A method as set forth in claim 53 including the further steps of applying adhesive to at least one flap of each receptacle, and moving the flaps of each receptacle into overlapping engagement to adhesively secure the same and thereby close said receptacles.

55. A method as set forth in claim 54 including the further step of inverting the closed receptacles to hold the closure flaps of each receptacle in engagement with each other.

56. A method as set forth in claim 55 including the further step of interspersing one group of closed inverted receptacles with another group of closed inverted receptacles to facilitate placing both groups of receptacles in a container.

References Cited

UNITED STATES PATENTS

| | | | |
|---|---|---|---|
| 2,216,884 | 10/1940 | Kott | 53—50 |
| 2,516,783 | 7/1950 | Matter | 53—50 |
| 3,121,300 | 2/1964 | Rossi | 53—50 |

THERON E. CONDON, Primary Examiner

N. ABRAMS, Assistant Examiner

U.S. Cl. X.R.

53—3, 26, 47, 50, 59, 159, 167, 374, 381; 156—542; 198—29, 30